(12) United States Patent
Gisquet et al.

(10) Patent No.: US 10,469,842 B2
(45) Date of Patent: Nov. 5, 2019

(54) ENCODER OPTIMIZATIONS FOR PALETTE LOSSLESS ENCODING OF CONTENT WITH SUBSAMPLED COLOUR COMPONENT

(71) Applicant: CANON KABUSHIKI KAISHA, Tokyo (JP)

(72) Inventors: Christophe Gisquet, Acigne (FR); Guillaume Laroche, Saint Aubin d'Aubigne (FR); Patrice Onno, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 258 days.

(21) Appl. No.: 15/425,422

(22) Filed: Feb. 6, 2017

(65) Prior Publication Data

US 2017/0230667 A1   Aug. 10, 2017

(30) Foreign Application Priority Data

Feb. 8, 2016 (GB) .................................. 1602229.5

(51) Int. Cl.
| | |
|---|---|
| *H04N 7/12* | (2006.01) |
| *H04N 19/147* | (2014.01) |
| *H04N 19/182* | (2014.01) |
| *H04N 19/587* | (2014.01) |
| *H04N 19/105* | (2014.01) |
| *H04N 19/176* | (2014.01) |
| *H04N 19/184* | (2014.01) |
| *H04N 19/186* | (2014.01) |

(52) U.S. Cl.
CPC ......... *H04N 19/147* (2014.11); *H04N 19/105* (2014.11); *H04N 19/182* (2014.11); *H04N 19/587* (2014.11); *H04N 19/176* (2014.11); *H04N 19/184* (2014.11); *H04N 19/186* (2014.11)

(58) Field of Classification Search
CPC .... H04N 19/153; H04N 19/186; H04N 19/70; H04N 19/176; H04N 19/93; H04N 19/91
USPC .......................... 375/240.01–240.29, 240.02
See application file for complete search history.

(56) References Cited

U.S. PATENT DOCUMENTS

| 2015/0341673 A1* | 11/2015 | Joshi ...................... H04N 19/70 |
| | | 375/240.12 |
| 2016/0094851 A1* | 3/2016 | Pu .......................... H04N 19/91 |
| | | 375/240.24 |
| 2016/0142721 A1 | 5/2016 | Shimada |
| 2017/0105002 A1* | 4/2017 | Chuang .................. H04N 19/70 |

(Continued)

*Primary Examiner* — Gims S Philippe
(74) *Attorney, Agent, or Firm* — Canon U.S.A., Inc. IP Division

(57) ABSTRACT

The invention relates to lossless encoding of pixel blocks. To apply the Palette coding mode, an input 4:2:0 block is up-sampled into a 4:4:4 block. Each 4:4:4 pixel is usually lossless encoded using a fully matching entry from the palette, thus being sub-optimal in terms of rate. This is mainly because lossless encoding is still used even for Chromas that have no impact on the decoded output image. To improve this situation, the invention provides that encoding the up-sampled 4:4:4 block includes encoding a 4:4:4 pixel corresponding to a 4:2:0 input pixel without Chromas, using a palette entry different from the 4:4:4 pixel. A lossy matching counter-intuitively does not provide losses in the decoded output image, since it is limited to Chromas discarded in the 4:2:0 block. Less palette entries are thus required, saving indexes and thus reducing the encoding rate.

17 Claims, 14 Drawing Sheets

(56) References Cited

U.S. PATENT DOCUMENTS

| | | | | |
|---|---|---|---|---|
| 2017/0310992 A1* | 10/2017 | Lee | ...................... | H04N 19/593 |
| 2017/0332073 A1* | 11/2017 | Lin | ...................... | H04N 19/186 |
| 2017/0374372 A1* | 12/2017 | Liu | ........................ | H04N 19/70 |
| 2017/0374384 A1* | 12/2017 | Xiu | ...................... | H04N 19/176 |
| 2018/0091829 A1* | 3/2018 | Liu | ........................ | H04N 19/93 |

* cited by examiner

ENCODER OPTIMIZATIONS FOR PALETTE LOSSLESS ENCODING OF CONTENT WITH SUBSAMPLED COLOUR COMPONENT

This application claims the benefit under 35 U.S.C. § 119(a)-(d) of United Kingdom Patent Application No. 1602229.5, filed on Feb. 8, 2016 and entitled "ENCODER OPTIMIZATIONS FOR PALETTE LOSSLESS ENCODING OF CONTENT WITH SUBSAMPLED COLOUR COMPONENT". The above cited patent application is incorporated herein by reference in its entirety.

FIELD OF THE INVENTION

The present invention concerns a method and a device for processing at least one image, in particular for lossless encoding a block of pixels in an image, usually into a bitstream. The invention finds a particular application with the so-called palette coding mode as introduced in HEVC Screen Content Coding (SCC) Extension of the High Efficiency Video Coding international standard (see document JCTVC-S1005).

BACKGROUND OF THE INVENTION

The invention applies more particularly to the situation where an input block has some pixels with all colour components (non-sub-sampled pixels) and some pixels with less colour components (sub-sampled input pixels) because of a sub-sampling scheme sub-sampling Chroma values (e.g. a 4:2:0 YUV block), and where such input block needs to be up-sampled into a pre-encode block of pre-encode pixels having each the same number of pixel or colour component values (i.e. no subsampling, e.g. a 4:4:4 YUV block), before it is processed.

The sub-sampled, and thus missing, pixel components are referred below to secondary pixel components, while the main pixel components are those present in both input and pre-encode pixels. In the example above, the main pixel component is the Luma colour component and the secondary (and missing in the sub-sampled input pixels) pixel components are the Chroma colour components.

An example of such situation requiring up-sampling before processing is the so-called palette coding mode, to which it is now made reference for illustrative purposes.

As known, the palette coding mode uses a palette comprising a set of entries associating respective entry indexes with corresponding sets of pixel colour component values. The palette makes it possible to build a block of indexes to be used to represent the pre-encode block of pre-encode pixels, i.e. to encode the input block of pixels.

A palette in this document is defined as a look up table having entries, or "elements", associating an index with a value of a pixel. Typically, the value of a pixel is constituted by the value of each colour component associated with the pixel, resulting in a colour palette. Well known colour spaces are RGB representing Red, Green and Blue components and YUV (or YCbCr) representing one Luma and two Chroma components.

When encoding an image in a video sequence, the image is first divided into coding entities (also known as "coding structures") of pixels of equal size referred to as Coding Tree Blocks (CTBs). The CTBs may be grouped into other coding structures having a higher hierarchical level, such as slices and/or tiles. In other words, the image is recursively divided into hierarchical coding structures or coding entities.

The size of a Coding Tree Block is typically 64 by 64 pixels. Each Coding Tree Block may then be broken down into a hierarchical tree of smaller blocks whose size may vary and which are the actual blocks of pixels to encode. These smaller blocks to encode are referred to as Coding Units (CUs).

The encoding of a particular Coding Unit involves competition between predictive coding modes, including the well-known INTRA coding mode, the well-known INTER coding mode, and the Palette coding mode.

With the Palette coding mode, it is possible to define a representative block for a given Coding Unit as a block of indexes (also known as "levels") from a palette: for each pixel location in the Coding Unit, the said representative block contains the index associated with a pixel value in the Palette which is the closest to the value of the pixel having the same location (i.e. colocated) in the coding unit. However, this palette-based algorithm of selecting the closest palette entry is only used at the encoder in HEVC SCC: there is no need to know said algorithm in order to parse or decode a bitstream at the decoder.

Typically, "closest" means with the lowest distance using a particular metric distance such as the sum of absolute, or the square of, differences of component values, in case of lossy encoding. In the particular case of lossless encoding, this means the palette entry should be selected as equal to the pixel by the encoder. In the following, "correspond to" or "match" is used to mean either "is equal" when in lossless coding, or "is the closest" otherwise.

In the recent version of HEVC SCC, no residual between the original pixel block and the corresponding palette-based representative pixel block is provided. To avoid high quality decreasing in the encoded image, an "escape-coded" feature has been introduced to encode the pixels, the values of which do not match a pixel value of an entry of the Palette. It means, in lossless encoding, that no palette entry is equal to the pixel value. Whether a CU is coded using escape coding is signalled by a flag. In addition, a specific index in the Palette is used to signal an "escape-coded" pixel; and the quantized value itself of the escape-coded pixel is directly encoded in the bitstream, the quantization depending on a quantizer step transmitted at the CU-level, only if the CU is signalled as using escape coding. In case of lossless encoding, the quantizer step is 0, meaning no quantization. The quantization is what is defined in the HEVC standard as the transform-bypass quantization, and the quantized values are encoded using truncated binary codes.

As currently proposed, the palette coding mode may be used for non-4:4:4 content, i.e. for input blocks conforming to an input sampling scheme having subsampling of at least one of the colour components forming the pixels, i.e. in which at least one sub-sampled input pixel includes the main pixel component or components but has secondary pixel component or components missing. This is for instance the case in 4:2:2 or 4:2:0 YUV signals where the Chroma components are subsampled and thus missing for some of the input pixels.

However, for this type of non-4:4:4 contents, the decoder first decodes the data as 4:4:4, and then discards the unused Chroma components to match the input format. It means that the encoder has to perform the reverse approach, by up-sampling the input block of pixels (e.g. in 4:2:2 or 4:2:0 sampling scheme of corresponding 4:2:2 or 4:2:0 Chroma formats) into a pre-encode block of pre-encode pixels conforming to a pre-encode sampling scheme having no sub-sampling of the colour components forming the pixels, e.g.

4:4:4 sampling scheme, i.e. in which all pre-encode pixels have all main and secondary pixel components.

The required up-sampling step introduces suboptimal computation when applying the palette coding mode to encode the pre-encode block of pixels. In particular, lossless encoding introduces stringent requirements that can actually be alleviated when the content is not 4:4:4.

SUMMARY OF THE INVENTION

The present invention has been devised to overcome all or part of the foregoing drawbacks. In particular, it seeks to improve the efficiency of encoding non-4:4:4 or the like contents using the Palette coding mode where an up-sampling of the contents into a 4:4:4 sampling scheme is required.

An idea of the inventor is to take advantage of the uselessness of the secondary pixel components (those that are discarded in some input pixels) to improve the lossless encoding efficiency.

Using this idea, embodiments of the invention provide a method of lossless encoding a block of pixels in an image, the method comprising the following steps:

obtaining an input block of input pixels conforming to an input sampling scheme in which at least one sub-sampled input pixel includes main pixel component or components but has secondary pixel component or components missing. As widely known, the input sampling scheme having sub-sampling of at least one colour component (usually Chroma component) makes that one of the pixel colour components is missing because it has been discarded or deleted by a subsampling operation. This is for instance the case of the well-known YUV 4:2:2 or 4:2:0 sampling schemes;

up-sampling the input block into a pre-encode block of pre-encode pixels conforming to a pre-encode sampling scheme in which all pre-encode pixels have all main and secondary pixel components. A straightforward correspondence between an input pixel and a pre-encode pixel may be defined, usually based on colocation within the two corresponding pixel blocks. Therefore, a pre-encode pixel is no more than the same collocated input pixel or the collocated input pixel with one or more reconstructed (secondary) missing colour components;

encoding the pre-encode block of pre-encode pixels using a palette coding mode, the palette coding mode using a palette comprising a set of entries associating respective entry indexes with corresponding sets of pixel component values, and wherein encoding the pre-encode block during the lossless encoding of the block of pixels includes encoding at least one pre-encode pixel that corresponds to a sub-sampled input pixel, using a palette entry different from the pre-encode pixel.

It mainly means that a palette entry whose secondary pixel component values are different from the secondary pixel components of the pre-encode pixel to encode is used. In other words, this approach authorizes losses when encoding the pre-encode block, while the overall encoding of the block of pixels is lossless.

This counter-intuitive approach provides substantial encoding benefits in terms of reduced rate: up to 3%, and on average 1% for intra-coded images; up to 2%, and on average 0.5% for inter-coded images. For instance, the size of the palette (and thus the number of bits to encode each index) is reduced, because the same palette entry can be used for a number of pre-encode pixels with different pixel values, as long as they have the same main pixel component(s) (i.e. the one or those not sub-sampled in the input pixel block) as the palette entry.

This approach is made possible because at the end the secondary pixel components that are lossy encoded are discarded when providing the output decoded image.

The sub-sampled input pixels having secondary pixel component or components missing can be identified using the parity of their pixel coordinates in the image. This is an easy way to identify those sub-sampled input pixels and corresponding pre-encode pixels. For instance, the sub-sampled input pixels in a 4:2:0 sampling scheme are identified by an odd abscissa or an odd ordinate; the sub-sampled input pixels in a 4:2:2 sampling scheme are identified by an odd abscissa.

Correspondingly, embodiments of the invention relate to a device for lossless encoding a block of pixels in an image, the device comprising at least one microprocessor configured for carrying out, in a web runtime environment running in the device, the steps of:

obtaining an input block of input pixels conforming to an input sampling scheme in which at least one sub-sampled input pixel includes main pixel component or components but has secondary pixel component or components missing;

up-sampling the input block into a pre-encode block of pre-encode pixels conforming to a pre-encode sampling scheme in which all pre-encode pixels have all main and secondary pixel components; and encoding the pre-encode block of pre-encode pixels using a palette coding mode, the palette coding mode using a palette comprising a set of entries associating respective entry indexes with corresponding sets of pixel component values, wherein encoding the pre-encode block during the lossless encoding of the block of pixels includes encoding at least one pre-encode pixel that corresponds to a sub-sampled input pixel, using a palette entry different from the pre-encode pixel.

The device provides the same advantages as the method defined above.

Optional features of embodiments of the invention are defined in the appended claims. Some of these features are explained here below with reference to a method, and can be transposed into system features dedicated to any device according to embodiments of the invention.

In embodiments, the method further comprises selecting the palette entry from the palette, wherein selecting the palette entry includes selecting a palette entry having the same main pixel component or components as the pre-encode pixel to encode the pre-encode pixel. This makes it explicit that the selected different palette entry differs from the pre-encoded pixel by the secondary pixel components (missing in the corresponding input pixel), since the kept and main pixel components match.

In more specific embodiments, the palette entries of the palette are successively considered, and the first considered palette entry that has the same main pixel component or components as the pre-encode pixel to encode the pre-encode pixel is selected. This configuration reduces the runtime and complexity since not all the palette entries are necessarily considered.

In a variant, all the palette entries of the palette are tested for the pre-encode pixel, using a metric that provides that following distortion score:

a maximum score if the main pixel component or components of the pre-encode pixel and of the palette entry considered do not match or if the pre-encode pixel corresponds to a non-sub-sampled input pixel and does not fully match the palette entry, a minimum score (usually zero) if all the pixel components of the pre-encode pixel match the palette entry, and a non-zero score representing a distortion measure between the secondary pixel component or components of the pre-encode pixel and the corresponding secondary pixel component or components of the palette entry considered, otherwise; and one of the tested palette entries is selected based on a rate/distortion criterion. The criterion may be evaluated once for the whole input block of pixels to select the palette entry for each pixel.

Counter-intuitively, a metric authorizing intermediary (non-minimum and non-maximum) scores is allowed and used, while the whole encoding is lossless. Again, this is implemented because some secondary pixel components in the pre-encode block correspond to discarded or sub-sampled pixel components in the input block Thus they have little to no impact on the decoded output.

The above provision thus makes it possible to optimize the encoding based on a rate/distortion approach, whereas the encoding is lossless.

In some embodiments, the method further comprises building the palette by iteratively considering each pre-encode pixel and adding a palette entry to the palette when no yet-existing palette entry (in the palette) matches the pre-encode pixel currently considered. A palette that efficiently represents the pixels of the block to encode is thus obtained.

In specific embodiments, building the palette further comprises, when considering a current pre-encode pixel corresponding to a non-sub-sampled input pixel (i.e. no secondary component of which is missing):

identifying a matching palette entry already associated with (i.e. used to encode or representative to encode) only pre-encode pixel or pixels that correspond to sub-sampled input pixel or pixels, the matching defining a matching between only the main pixel component or components of the current pre-encode pixel and of the palette entry, and forcing the pixel components of the palette entry to the pixel components of the current pre-encode pixel.

According to this provision, a palette entry which has impact, on the decoded output, only regarding the main (non-discarded) pixel component(s), can be modified in order to perfectly match a pre-encode pixel corresponding to a non-sub-sampled input pixel (i.e. with no sub-sampled component). Thus, adding a new palette entry is avoided and a not-matching palette entry is used.

As a result the size of the palette is reduced, and the bit costs to encode the palette indexes are also substantially reduced.

In other specific embodiments, the matching between a palette entry and the pre-encode pixel currently considered includes evaluating a matching:

between only the main pixel component or components of the pre-encode pixel currently considered and of the palette entry when the pre-encode pixel currently considered or all the pre-encode pixels already associated with the palette entry correspond to sub-sampled input pixel or pixels, or between all the main and secondary components of the pre-encode pixel currently considered and of the palette entry, otherwise.

This definition of a "matching" prima facie does not meet the requirements of a lossless encoding, in particular because of a partial matching (matching of the main component(s) only). Thanks to that, the number of new palette entries added is reduced. This is because a plurality of different pre-encode pixels corresponding to sub-sampled input pixels can be represented (or encoded) using the same palette entry, without impact on the decoded output since the missing secondary pixel components have not impact on it. This is also because one pre-encode pixel corresponding to one non-sub-sampled input pixel may also be associated with the same palette entry, as long as all the pixel components perfectly match, possibly after the non-impacting secondary pixel components have been set to the non-sub-sampled input pixel considered.

In some embodiments, the method further comprises predicting the palette using palette entry predictors, wherein predicting the palette includes:

identifying a palette entry associated with only pre-encode pixel or pixels that correspond to sub-sampled input pixel or pixels (i.e. with secondary pixel components missing or discarded), and the main pixel component or components of which perfectly matches the corresponding main pixel component or components of a palette entry predictor, forcing the palette entry to the matching palette entry predictor.

Palette prediction is known to improve coding efficiency. Thanks to the above approach, the prediction can be increased, thereby the coding efficiency, by forcing a palette entry to a predictor if its non-matching pixel component or components have no impact on the decoded image output. This is particularly the case for the secondary pixel components if the palette entry is only used for pre-encode pixels corresponding to sub-sampled input pixels.

In some embodiments, the main pixel component or components include (or are) the Luma colour component and the secondary pixel component or components include (or are) the Chroma colour components. In other words, the input sampling scheme subsamples at least one Chroma component of the pixels, for instance a YUV 4:2:0 scheme.

According to another approach of the invention, there is provided a method of encoding blocks of pixels in an image, the pixels having pixel components, the method comprising the following steps:

obtaining a palette comprising a set of entries associating respective entry indexes with corresponding sets of pixel component values;

encoding at least one block of pixels using a palette coding mode, the palette coding mode using the obtained palette to encode at least one pixel with a palette entry index, wherein obtaining the palette includes iterating one or more time a palette building and predicting process, wherein in case the encoding of the blocks of pixels is lossless, iterating only once the palette building and predicting process.

This approach provides a fast palette obtaining in case of lossless encoding, compared to lossy encoding which usually requires several iterations to obtain various palette candidates to be challenged for optimization.

Correspondingly, this other approach also provides a device for encoding blocks of pixels in an image, the pixels having pixel components, the device comprising at least one microprocessor configured for carrying out, in a web runtime environment running in the device, the steps of:

obtaining a palette comprising a set of entries associating respective entry indexes with corresponding sets of pixel component values;

encoding at least one block of pixels using a palette coding mode, the palette coding mode using the obtained palette to encode at least one pixel with a palette entry index, wherein obtaining the palette includes iterating one or more time a palette building and predicting process, wherein in case the encoding of the blocks of pixels is lossless, iterating only once the palette building and predicting process.

Optional features of this other approach are defined in the appended claims. Some of these features are explained here below with reference to a method, and can be transposed into system features dedicated to any device according to embodiments of the invention.

In embodiments, in case the encoding of the blocks of pixels is lossy, the palette building and predicting process is iterated two or more times to obtain two or more palette candidates, and one of the two or more palette candidates is selected as the obtained palette, based on a rate/distortion criterion.

In specific embodiments, different initialized palettes are used to start the two or more iterations of the palette building and predicting process. This is to vary the obtained palette candidates for optimizing the palette to be used for lossy encoding.

Other embodiments of the invention relate to a method of generating a bitstream from a sequence of images, comprising encoding block of pixels in one or more of the images using any of the methods as defined above and forming the bitstream from the encoded block of pixels.

Other embodiments of the invention relate to a bitstream data structure including encoded blocks of pixels obtained by any of the methods as defined above.

Other embodiments of the invention relate to a non-transitory computer-readable medium storing a program which, when executed by a microprocessor or computer system in a device, causes the device to perform any method as defined above.

The non-transitory computer-readable medium may have features and advantages that are analogous to those set out above and below in relation to the method and device.

Other embodiments of the invention relate to a method of encoding a block of pixels in an image, each pixel having a plurality of pixel component values, substantially as herein described with reference to, and as shown in, FIG. 10 or 11 or 12 or 13 or any combination thereof of the accompanying drawings.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

BRIEF DESCRIPTION OF THE DRAWINGS

Embodiments of the invention will now be described, by way of example only, and with reference to the following drawings in which.

DETAILED DESCRIPTION OF EMBODIMENTS OF THE INVENTION

Figure 1:
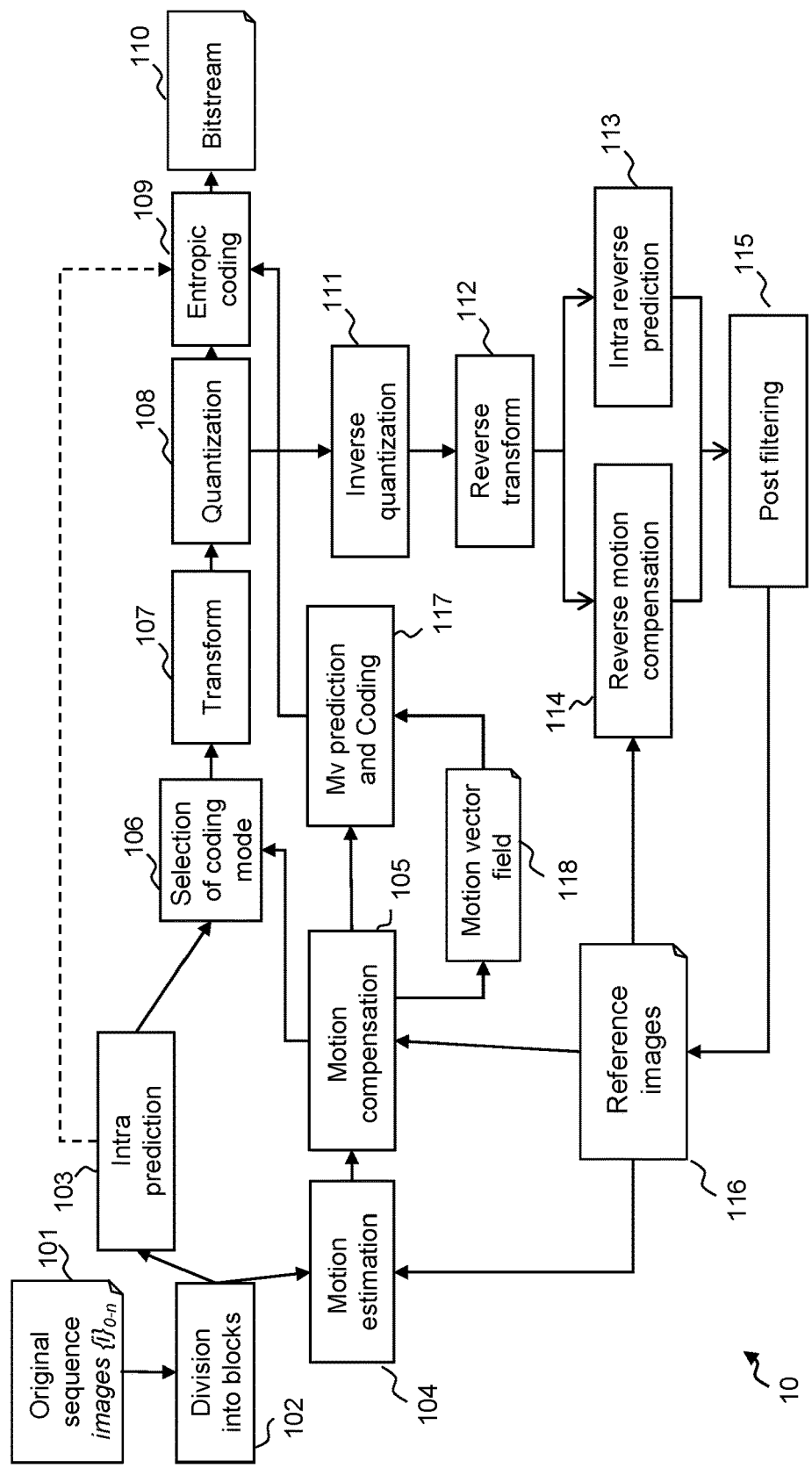
FIG. 1 illustrates the HEVC encoder architecture.

FIG. 1 illustrates the HEVC encoder architecture. In the video encoder, an original sequence 101 is divided into blocks of pixels 102. A coding mode is then assigned to each block. There are two families of coding modes typically used in HEVC: the modes based on spatial prediction or INTRA modes 103 and the modes based on temporal prediction or INTER modes based on motion estimation 104 and motion compensation 105. An extension of HEVC being currently designed, known as HEVC SCC, adds additional coding modes, in particular the Palette coding mode, which competes with INTRA and INTER coding modes to encode blocks of pixels. Parts of the Palette coding mode are described in more details below, in particular with reference to FIGS. 5 to 9. One skilled in the art may also obtain details about the Palette coding mode in document JCTVC-S1005 (HEVC Screen Content Coding Draft Text 2), the latest as of writing.

To be noted that the invention is mainly described with respect to the Palette coding mode as specified in the HEVC SCC extension, but may apply to any other encoding process that requires up-sampling an input signal into a 4:4:4 or the like signal (i.e. with all pixels having all colour components).

An INTRA Coding Unit is generally predicted from the encoded pixels at its causal border by a process called INTRA prediction.

Temporal prediction of an INTER coding mode first consists in finding in a previous or future frame called the reference frame 116 the reference area of which is the closest to the Coding Unit, in a motion estimation step 104. This reference area constitutes the predictor block. Next this Coding Unit is predicted using the predictor block to compute the residue in a motion compensation step 105.

In both cases, spatial and temporal prediction, a residual is computed by subtracting the Coding Unit from the original predictor block.

In the INTRA prediction, a prediction direction is encoded. In the temporal prediction, at least one motion vector is encoded. However, in order to further reduce the bitrate cost related to motion vector encoding, a motion vector is not directly encoded. Indeed, assuming that motion is homogeneous, it is particularly advantageous to encode a motion vector as a difference between this motion vector, and a motion vector in its surroundings. In the H.264/AVC coding standard for instance, motion vectors are encoded with respect to a median vector computed between three blocks located above and on the left of the current block. Only a difference, also called residual motion vector, computed between the median vector and the current block motion vector is encoded in the bitstream. This is processed in module "Mv prediction and coding" 117. The value of each encoded vector is stored in the motion vector field 118. The neighbouring motion vectors, used for the prediction, are extracted from the motion vector field 118.

Next, the mode optimizing the rate distortion performance is selected in module 106. In order to further reduce the redundancies, a transform, typically a DCT, is applied to the residual block in module 107, and a quantization is applied to the coefficients in module 108. The quantized block of coefficients is then entropy coded in module 109 and the result is inserted into the bitstream 110.

The encoder then performs a decoding of the encoded frame for the future motion estimation in modules 111 to 116. This is a decoding loop at the encoder, similar to the decoding at the decoder. These steps allow the encoder and the decoder to have the same reference frames. To reconstruct the coded frame, the residual is inverse quantized in module 111 and inverse transformed in module 112 in order to provide the "reconstructed" residual in the pixel domain. According to the encoding mode (INTER or INTRA), this residual is added to the INTER predictor 114 or to the INTRA predictor 113.

Next, this first reconstruction is filtered in module 115 by one or several kinds of post filtering. These post filters are integrated into the decoding loop. This means that they need to be applied to the reconstructed frame at the encoder and decoder in order to use the same reference frames at the encoder and decoder. The aim of this post filtering is to remove compression artefacts.

Figure 2:
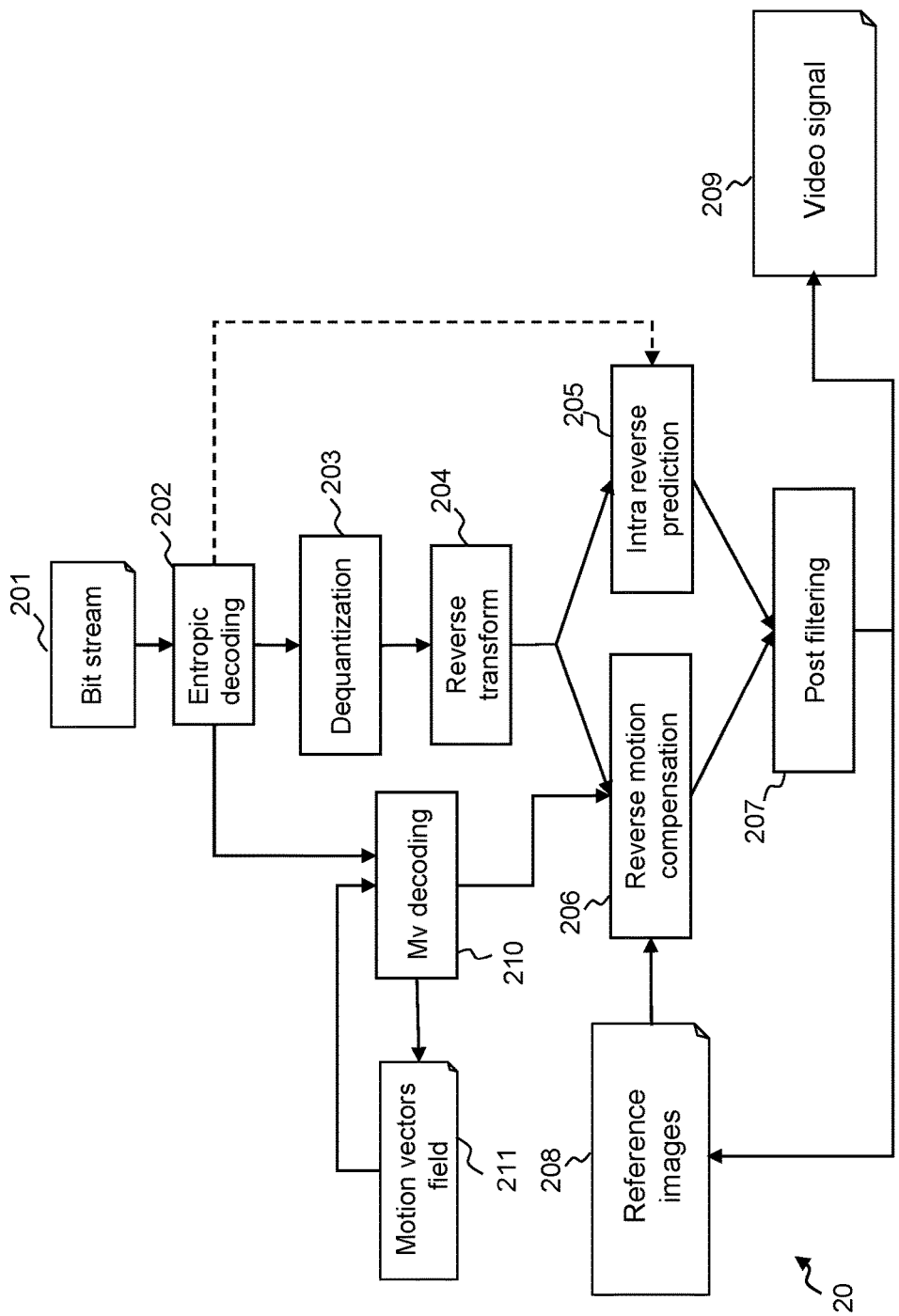
FIG. 2 illustrates the HEVC decoder architecture.

The principle of an HEVC decoder has been represented in FIG. 2. The video stream 201 is first entropy decoded in a module 202. The residual data are then inverse quantized in a module 203 and inverse transformed in a module 204 to obtain pixel values. The coding mode data are also entropy decoded and depending on the coding mode, an INTRA type decoding or an INTER type decoding or a Palette type decoding is performed. In the case of INTRA mode, the INTRA prediction direction is decoded from the bitstream. The prediction direction is then used to locate the reference area 205. If the mode is INTER, the motion information is decoded from the bitstream 202. This is composed of the reference frame index and the motion vector residual. The motion vector predictor is added to the motion vector residual to obtain the motion vector 210. The motion vector is then used to locate the reference area in the reference frame 206. Note that the motion vector field data 211 are updated with the decoded motion vector in order to be used for the prediction of the next decoded motion vectors. This first reconstruction of the decoded frame is then post filtered 207 with exactly the same post filter as used at the encoder side. The output of the decoder is the de-compressed video 209.

Figure 3:
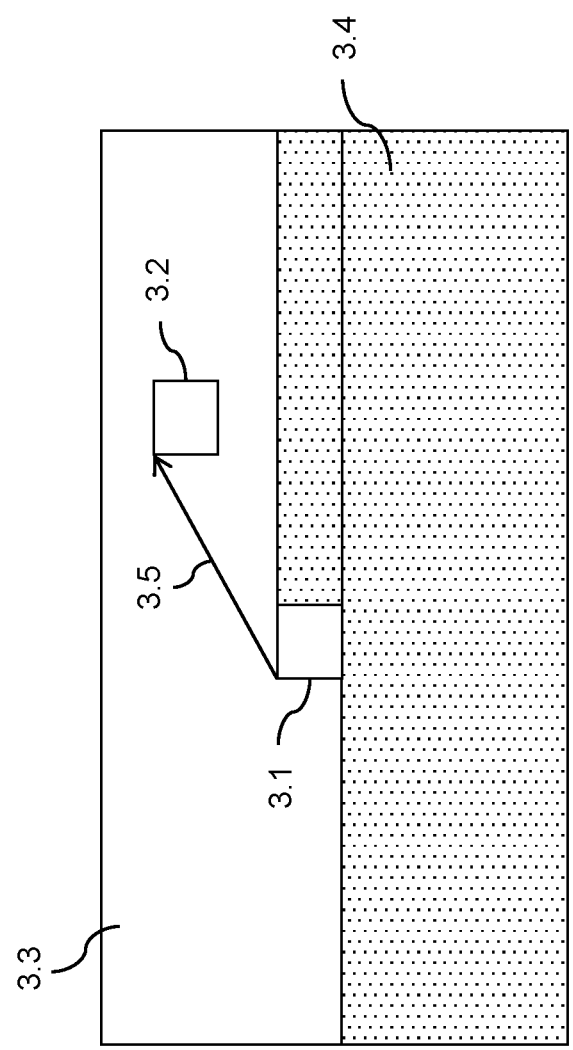
FIG. 3 illustrates the concept of the causal area.

FIG. 3 illustrates the causal principle resulting from block-by-block encoding as in HEVC.

At a high-level, an image is divided into Coding Units that are encoded in raster scan order. Thus, when coding block 3.1, all the blocks of area 3.3 have already been encoded, and can be considered available to the encoder. Similarly, when decoding block 3.1 at the decoder, all the blocks of area 3.3 have already been decoded and thus reconstructed, and can be considered as available at the decoder. Area 3.3 is called the causal area of the Coding Unit 3.1. Once Coding Unit 3.1 is encoded, it will belong to the causal area for the next Coding Unit. This next Coding Unit, as well as all the next ones, belongs to area 3.4 illustrated as a dotted area, and cannot be used for coding the current Coding Unit 3.1. It is worth noting that the causal area is constituted by reconstructed blocks. The information used to encode a given Coding Unit is not the original blocks of the image for the reason that this information is not available at decoding. The only information available at decoding is the reconstructed version of the blocks of pixels in the causal area, namely the decoded version of these blocks. For this reason, at encoding, previously encoded blocks of the causal area are decoded to provide this reconstructed version of these blocks. This is the decoding loop as mentioned above.

It is possible to use information from a block 3.2 in the causal area when encoding a block 3.1. In the HEVC Extension draft specifications, a displacement or motion vector 3.5, which can be transmitted in the bitstream, may indicate this block 3.2.

Figure 4:
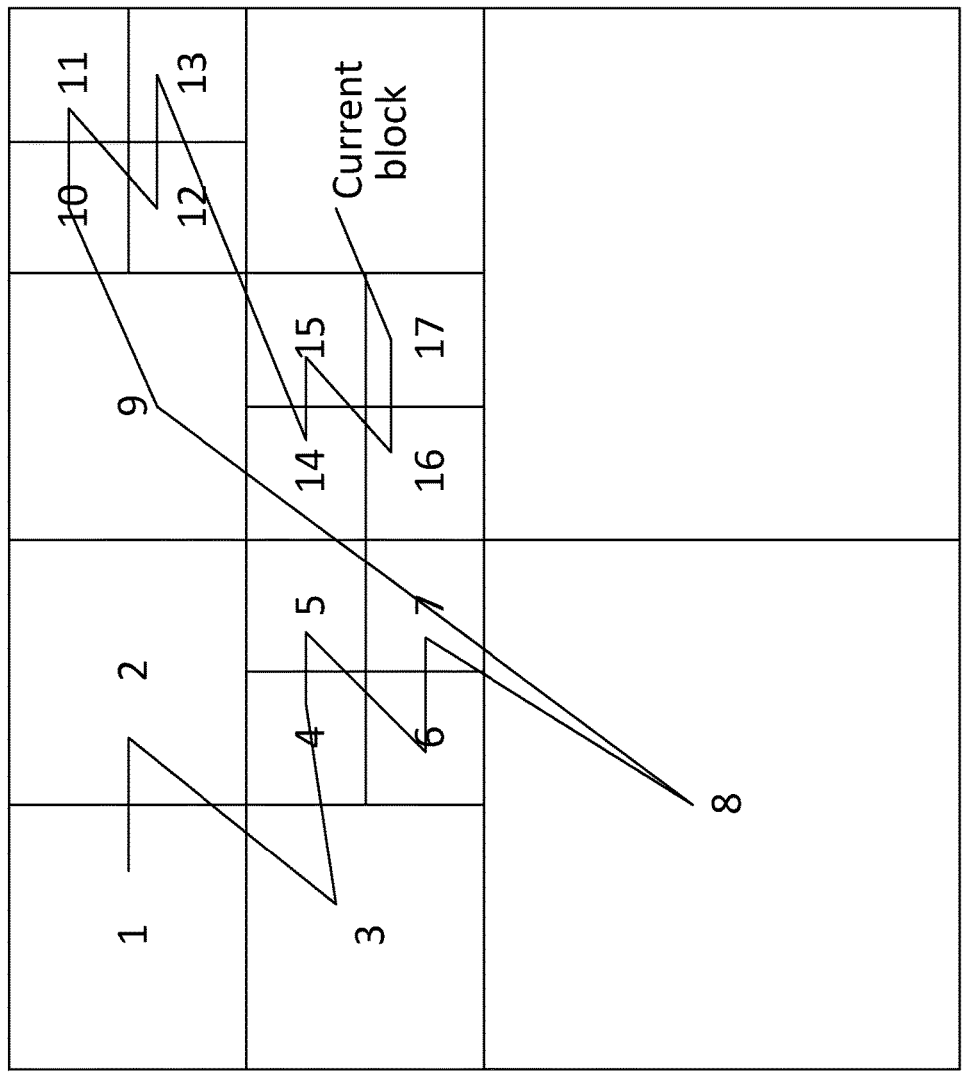
FIG. 4 illustrates the Coding Tree Block splitting into Coding Units and the scan order decoding of these Coding Unit.

FIG. 4 illustrates a splitting of a Coding Tree Block into Coding Units and an exemplary scan order to sequentially process these Coding Units. In the HEVC standard, the block structure is organized by Coding Tree Blocks (CTBs). A frame contains several non-overlapped and square Coding Tree Blocks. The size of a Coding Tree Block can range in size from 64×64 to 16×16. This size is determined at sequence level. The most efficient size, in term of coding efficiency, is the largest one: 64×64. Note that all Coding Tree Blocks have the same size except for the image border, meaning that they are arranged in rows. The size of the border CTBs is adapted according to the number of remaining pixels.

Each Coding Tree Block contains one or more square Coding Units (CU). The Coding Tree Block is split based on a quad-tree structure into several Coding Units. The processing (coding or decoding) order of each Coding Unit in the Coding Tree Block follows the quad-tree structure based on a raster scan order. FIG. 4 shows an example of the processing order of Coding Units. In this figure, the number in each Coding Unit gives the processing order of each corresponding Coding Unit of this Coding Tree Block.

In HEVC, several methods are used to code the different syntax elements, for example block residuals, information on predictor blocks (motion vectors, INTRA prediction directions, etc.). HEVC uses several types of entropy coding such as the Context based Adaptive Binary Arithmetic Coding (CABAC), Golomb-Rice Code, or simple binary representation called Fixed Length Coding. Most of the time a binary encoding process is performed to represent the different syntax elements. This binary encoding process is also very specific and depends on the different syntax element.

The HEVC Screen Content Coding Extension, also commonly called HEVC SCC, is an extension that is currently being drafted for the new video coding standard HEVC. It is derived from the HEVC Range Extension, also commonly called HEVC RExt.

An aim of this extension is to provide additional tools to encode video sequences in particular for the 4:4:4 colour format with 8 bits of bit-depth, and possibly losslessly, containing contents such as graphical user interfaces captures, computer-graphic generated content, etc. (known as Screen Contents).

A colour image is generally made of three colour components R, G and B. These components are generally correlated, and it is very common in image and video compression to de-correlate the colour components prior to processing the images.

The most common format that de-correlates the colour components is the YUV colour format. YUV signals are typically created from RGB representation of images, by applying a linear transform to the three inputs R, G and B input frames. Y is usually called Luma component, U and V are generally called Chroma components. The term 'YCbCr' is also commonly used in place of the term 'YUV'.

HEVC SCC, beside lossy compression, is also able to provide a lossless encoding of the input sequences; this is to have a decoded output 209 strictly identical to the input 101. To achieve this, a number of tools have been modified or added, compared to the conventional HEVC RExt lossy codec.

Additional tools for HEVC SCC are currently being designed to efficiently encode "screen content" video sequences in addition to natural sequences. As briefly introduced above, the "screen content" video sequences refer to particular video sequences which have a very specific content corresponding to those captured from a personal computer of any other device, containing for example text, PowerPoint presentation, Graphical User Interface, tables (e.g. screen shots). These particular video sequences have quite different statistics compared to natural video sequences. In video coding, performance of conventional video coding tools, including HEVC, proves sometimes to be underwhelming when processing such "screen content".

The tools currently discussed on in HEVC SCC to process "screen content" video sequences include the Adaptive Color Transform, the Intra Block Copy mode and the Palette mode. Prototypes for these modes have shown good coding efficiency compared to the conventional method targeting natural video sequences. An application of the present invention focuses on the Palette coding mode.

The Palette coding mode of HEVC SCC is a coding mode, meaning that the information directly codes pixel data. As currently drafted, the Palette coding mode does not use residual data, but uses an "escape coding" when a pixel does not match an entry of the palette currently used. In particular, in case of lossless coding, this means the palette entry to be selected by the encoder should be equal to the pixel considered, and in case no palette entry equals the pixel, the latter is escape-coded and its pixel value (e.g. three colour components) is not quantized and transmitted as such, the quantizer value being transmitted at the CU level. In case of lossy coding, a quantization may be implemented and/or the matching between a palette entry and a pixel considered may be approximating. On the contrary, in case of lossless encoding, no quantization is performed, meaning that the quantizer value is zero.

Figure 6:
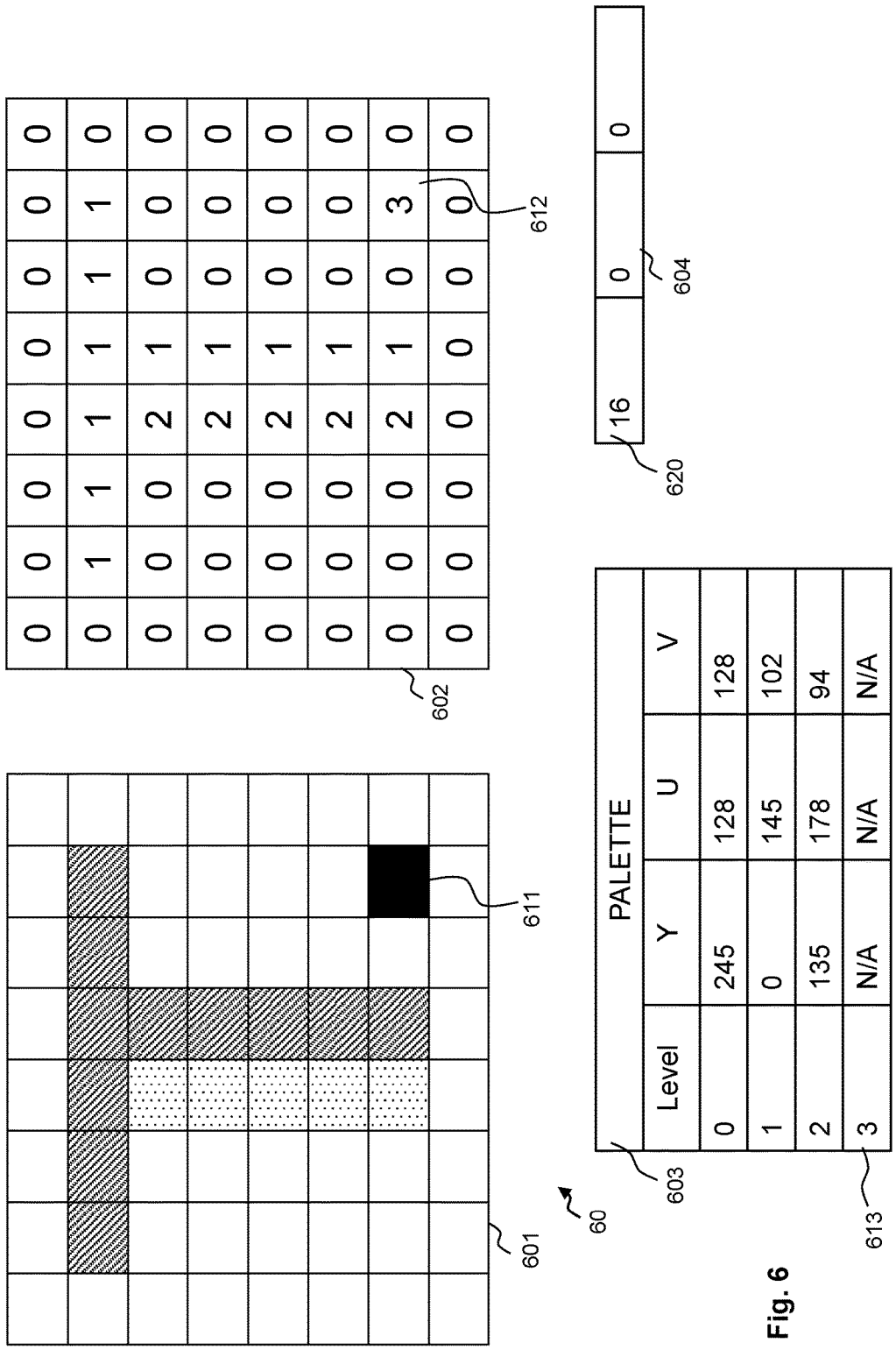
FIG. 6 illustrates an example of a coding unit with its corresponding block of levels and the associated palette.
Figure 7:
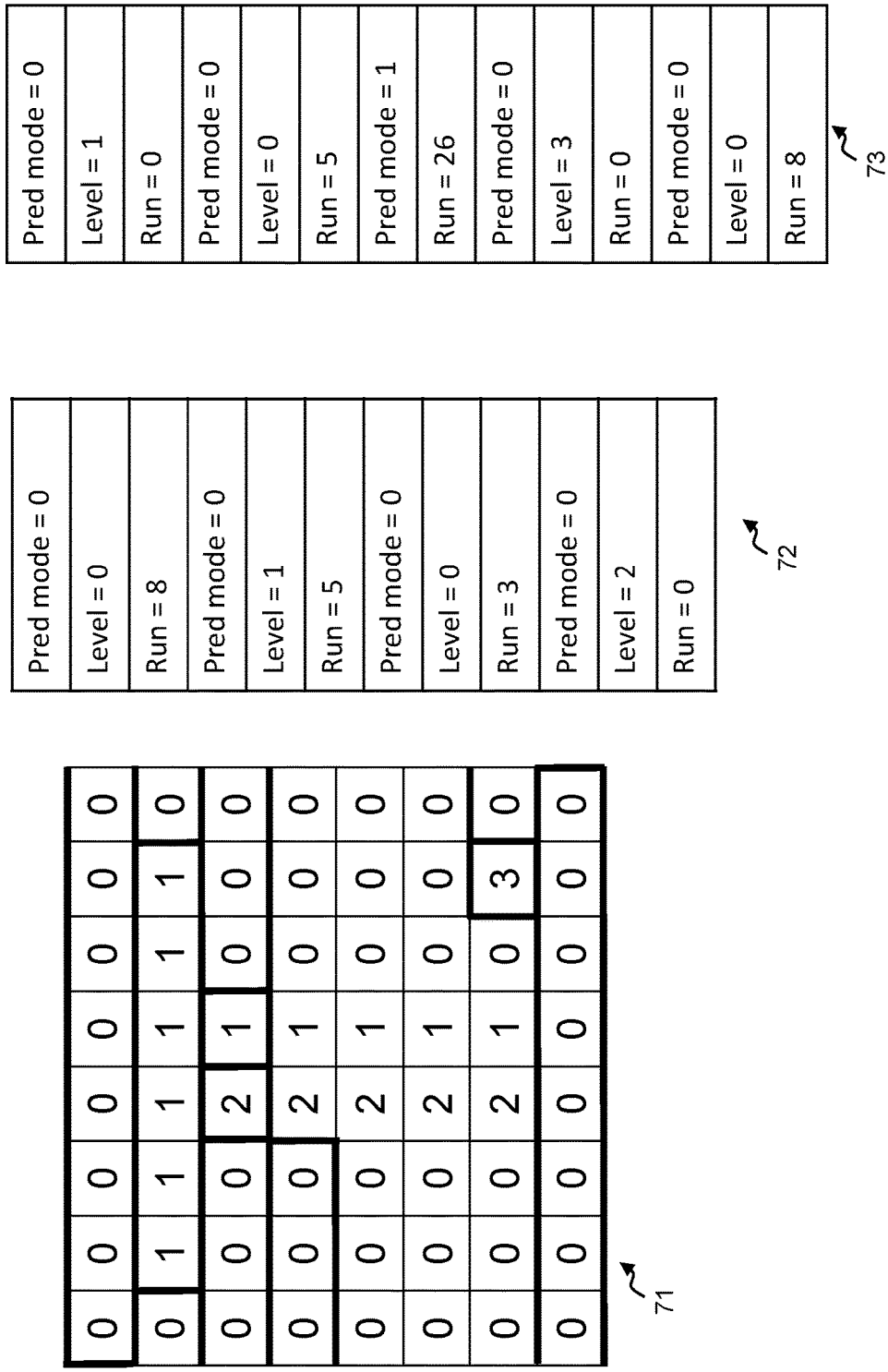
FIG. 7 illustrates the same block of levels and the set of syntax elements used for the encoding of this block of levels.

A palette is generally represented by a table containing a finite set of N-tuple of colours, each colour being defined by its colour components in a given colour space (see for example 603 in FIG. 6 based on the YUV colour space). For example, in a typical RGB or YUV format, the palette is composed of a list of P elements of N-tuple (where N=3 for RGB or YUV). More precisely, each element corresponds to a fixed triplet of colour components in the RGB or YUV format. Of course a palette is not limited to a RGB or YUV colour format. Any other colour format can be represented by a palette and can use a smaller or a higher number of colour components, meaning that N may be different from 3.

At the encoder side, the Palette coding mode, under consideration in HEVC SCC, consists in transforming pixel values of a given input 4:4:4 coding unit into indexes called levels. The levels identify the entries in an associated palette, the pixel values (or colour component values) of which match the pixel values of the input coding unit. However, when a pixel value of the input coding unit cannot be represented by a level (i.e. it does not match the pixel values), e.g. because the distortion would be too large (greater than 0 in case of lossless coding), then said pixel is represented by a specific level, indicating "escape coding" as introduced above. For each pixel being represented by this specific "escape coding" level, quantized pixel values are furthermore transmitted in a block of quantized values.

After the palette-based transformation, the resulting coding unit is thus composed of a block of levels and a separate block of quantized values (for the escape-coded pixels). It is then transmitted to the decoder with the associated palette, generally a table having a finite number of triplets of colours used to represent the coding unit. Since the palette defines a finite number of colours, the transformation into a block of indexes usually approximates the original input coding unit in lossy coding, but strictly corresponds to the original input coding unit in lossless coding.

To apply the Palette mode at the encoder side, an exemplary way to transform a coding unit of pixels is performed as follows:
  find the P colour triplets best describing the coding unit of pixels to encode, for example by minimizing overall distortion;
  then associate a respective palette entry from among the P triplet entries with each pixel of the coding unit, the colour triplet of the palette entry matching the pixel colour triplet: the value to encode (or level) (which thus forms part of the block of indexes or levels) is then the index corresponding to the palette entry having the matching colour. The block of indexes is thus obtained from the palette by comparing the entries of the palette to each pixel of the coding unit, in order to identify, for each pixel, the entry which best matches its pixel colour components. If no entry matches, then the level indicating escape coding is associated with the pixel (in the block of levels). The quantized pixel values corresponding to the escape-coded pixel may thus be stored in the block of quantized values, different from the block of levels.

For each coding unit, the palette (i.e. the P colour triplets found), the block of indexes or levels and the block of quantized pixel values are coded in the bitstream 110 and sent to the decoder.

Furthermore, specific flags may be provided in some sets of parameters in the bitstream to specify whether or not the Palette coding mode is activated (for instance in the Sequence Parameter Set, or "SPS"). Those sets of parameters are also referred to as syntax structures.

Also, at the coding unit level, a flag may specify whether or not the coding unit has escape-coded values, to either force the palette to include the above-mentioned specific "escape coding" level, or to save one palette entry (and thus reduce the codeword length to encode the indexes).

At the decoder, the Palette coding mode consists in performing the conversion in the reverse way. This means that each decoded index associated with each pixel of the coding unit is replaced by the corresponding colour in the palette decoded from the bitstream, in order to reconstruct the corresponding colour for each pixel of the coding unit. Note that if a pixel is associated with the "escape coding" level, then the corresponding quantized pixel value (e.g. three colour components) is decoded and inverse quantized from the block of quantized pixel values (i.e. of escape-coded pixels). This is the reconstruction of the block of indexes in the colour space (i.e. of the coding unit predictor).

Figure 5:
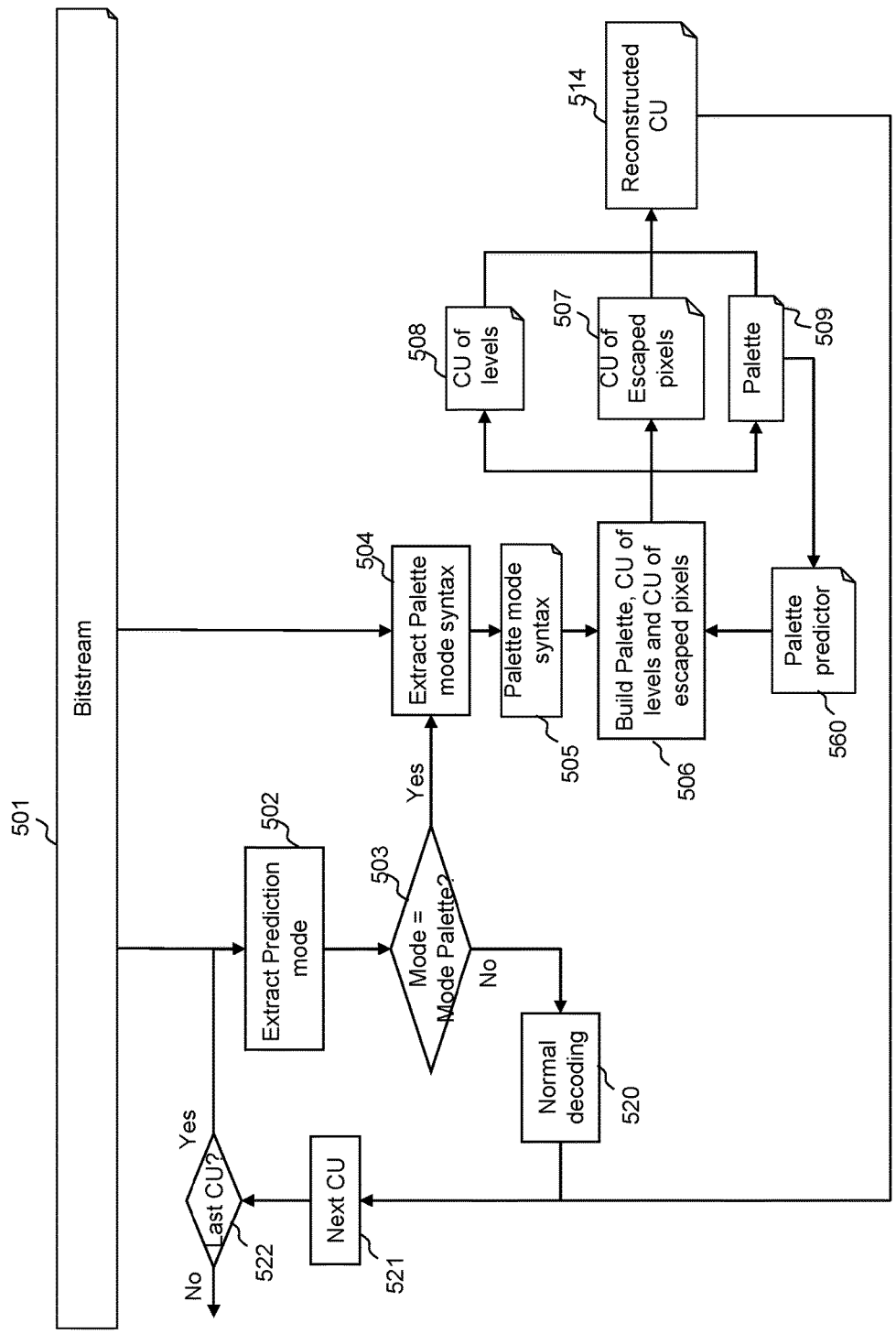
FIG. 5 illustrates the principle of Palette coding mode at the decoder side according to HEVC SCC, possibly using a palette predictor.

FIG. 5 further illustrates the principle of the Palette coding mode at the decoder. When decoding a slice, frame or tile, the decoding process loops over the CUs from the bitstream 501, starting from a first coding unit. Then, the prediction mode for the current coding unit is extracted at step 502 from the bitstream 501. Currently, the Palette coding mode is identified by a flag located after the skip flag and the intra block copy flag in the bitstream (the other coding modes have been described above with reference to FIGS. 1 and 2). This flag is CABAC coded using a single context. If this mode is not the Palette coding mode (test 503), then conventional decoding occurs at step 520. Otherwise, the related syntax of the Palette coding mode 505, i.e. the information on the palette, the block of levels and the block of escape-coded pixels (quantized values), is extracted and decoded 504 from the bitstream 501.

Next, during step 506, the following elements are built from the data decoded at step 505: the palette 509, the block of escape-coded pixels 507 and the block of levels 508. From the block of levels, the associated palette and the block of escape-coded pixels, the reconstructed coding unit in pixel domain 514 is built. This means that for each pixel of the coding unit, the corresponding level in the block of levels is converted into a colour (RGB or YUV) using the palette.

Optionally, the palette 509 can be predicted from one or more palette predictors 560, in which case the amount of information on the palette as provided in the bitstream 501 by the encoder may be reduced.

Although a palette predictor may be identified in the bitstream, the example of the Figure shows that one palette predictor may be built from one or more palettes previously used. If the encoder knows the palette predictor building process at the decoder, no identification of a palette predictor is required in the bitstream, and entries in the palette predictor used to predict some entries of the palette may be signalled. The entries in the palette predictor may be referred to as palette entry predictor.

As shown in the Figure, the palette 509 is used to update the palette predictor 560 which will be used for predicting the palette for the next palette-coded block.

Various ways to update the palette predictor may be contemplated, such as for instance setting the current palette as the new palette predictor for the next palette-coded block, or retrieving the N most relevant entries (most used) of the current palette to replace the N least relevant entries (least used or oldest) of the palette predictor. Of course, a number of other mechanisms can be contemplated. For instance the new palette predictor may be made of the entries of the last palette used supplemented with (and followed by) the N first non-used entries of the last palette predictor.

Signalling in the bitstream which entries of the palette predictor can be reused in the current palette (i.e. which predictor entry fully predicts one palette entry), may be implemented by providing an appropriate flag for each entry of the palette predictor thereby indicating whether that entry is reused or not, i.e. is to be added to the current palette or not.

FIG. 6 illustrates the principle of the Palette coding mode at the encoder, the palette being already built. The current coding unit 601 is converted into a block 602 of the same size which contains a level for each pixel instead of three colour values (Y, U, V) or (R, G, B). For means of illustration, pixel 611 of 601 is actually escape-coded and therefore, its associated level 612 indicates the escape coding level 613 (value "3") of the palette. As a consequence, block 604 of escape-coded pixels contains the quantized pixel value 620 of a single pixel.

Note that the palette 603 associated with block of levels 602 may be built based on coding unit overall distortion minimization and may thus associate, in each entry, an entry index or level with corresponding pixel colour values.

As mentioned above in relation to FIG. 5, the palette (as well as the block of escape-coded pixels) is coded and inserted into the bitstream for each coding unit. In the same way, the block of levels (corresponding to the coding unit) is coded and inserted into the bitstream and an example of the coding is given below with reference to FIG. 7. In this example, the block of levels is scanned in a horizontal order.

In this example, the block of levels 71 is exactly the same as the one illustrated in FIG. 6 under reference 602. The tables 72 and 73 describe the successive syntax elements used to code the block of levels 71. Table 73 should be read as the continuation of table 72. The syntax elements in the table correspond to the encoding of the groups of levels surrounded by bold lines in the block 71.

Indeed, the block of levels is encoded by group of successive pixels in scan order (e.g. row by row, column by column, etc). Each group is encoded using a first syntax element giving a prediction direction, a second element giving the repetition, and an optional third element giving the value of the pixel, namely the level. The repetition corresponds to the number of pixels in the group.

These two tables represent the current syntax associated with the Palette coding mode. These syntax elements correspond to the encoded information inserted in the bitstream for the block of levels 71. In these tables, the three main syntax elements are used to fully represent the operations of the Palette coding mode and are used as follows when successively considering the levels of the block of levels 71.

The first syntax element, called "Pred mode" makes it possible to distinguish between two encoding modes. In a first mode corresponding to "Pred mode" flag equal to "0", a new level is used for the current pixel. The level is immediately signalled after this flag in the bitstream. In a second mode corresponding to "Pred mode" flag equal to "1", a "copy up" mode is used. More specifically, this means that the current pixel level corresponds to the level of the pixel located at the line immediately above starting on the same position for a raster scan order. In that case of "Pred mode" flag equal to "1", there is no need to signal a level immediately after the flag because the value of the level is known by reference to the value of the level of the pixel just above in the block of levels 71.

The second syntax element called "Level" indicates the level value of the palette for the current pixel only in the first mode of "Pred mode", or the level value for escape-coding of the pixel.

The third syntax element, called "Run", is used to encode a repetition value in both modes of "Pred mode". Considering that the block of levels 71 is scanned from the top left corner to the bottom right corner, row by row from left to right and top to bottom, the Run syntax element gives the number of successive pixels in block 71 having the same encoding.

The "Run" syntax element has a different meaning depending on the "pred mode" flag. When Pred mode is 0, "Run" element is the number of successive pixels of the block of indexes having the same level value. For example, if Run=8 this means that the current "Level" is applied to the current pixel and to the following eight pixels which corresponds to ninve identical successive samples in raster scan order.

When Pred mode is 1, "Run" element is the number of successive pixels of the block of indexes having a level value corresponding to the level value of their above pixel in block 71, i.e. where the "copy up" mode is applied. For example, if Run=26 this means that the level of the current pixel is copied from the pixel of the line above as well as the following 26 pixels which corresponds to 27 pixels in total.

Tables 72 and 73 represent the nine steps to represent the block 71 by using the Palette coding mode. Each step starts with the coding of the "Pred mode" flag which is followed by the "Level" syntax element when "Pred mode" flag equals "0", or by the "Run" syntax element when "Pred mode" flag equals "1". The "Level" syntax element is always followed by a "Run" syntax element.

When the prediction mode decoded for the current block is the palette coding mode, the decoder first decodes the syntax relating to this block and then applies the reconstruction process for the coding unit.

The additional tools of HEVC SCC, such as the palette coding mode, have originally been provided for 4:4:4 signals as mentioned above. Since then, slight adaptations have been provided to allow subsampled contents, such as 4:2:2 or 4:2:0 for instance, to be processed.

Figure 8:
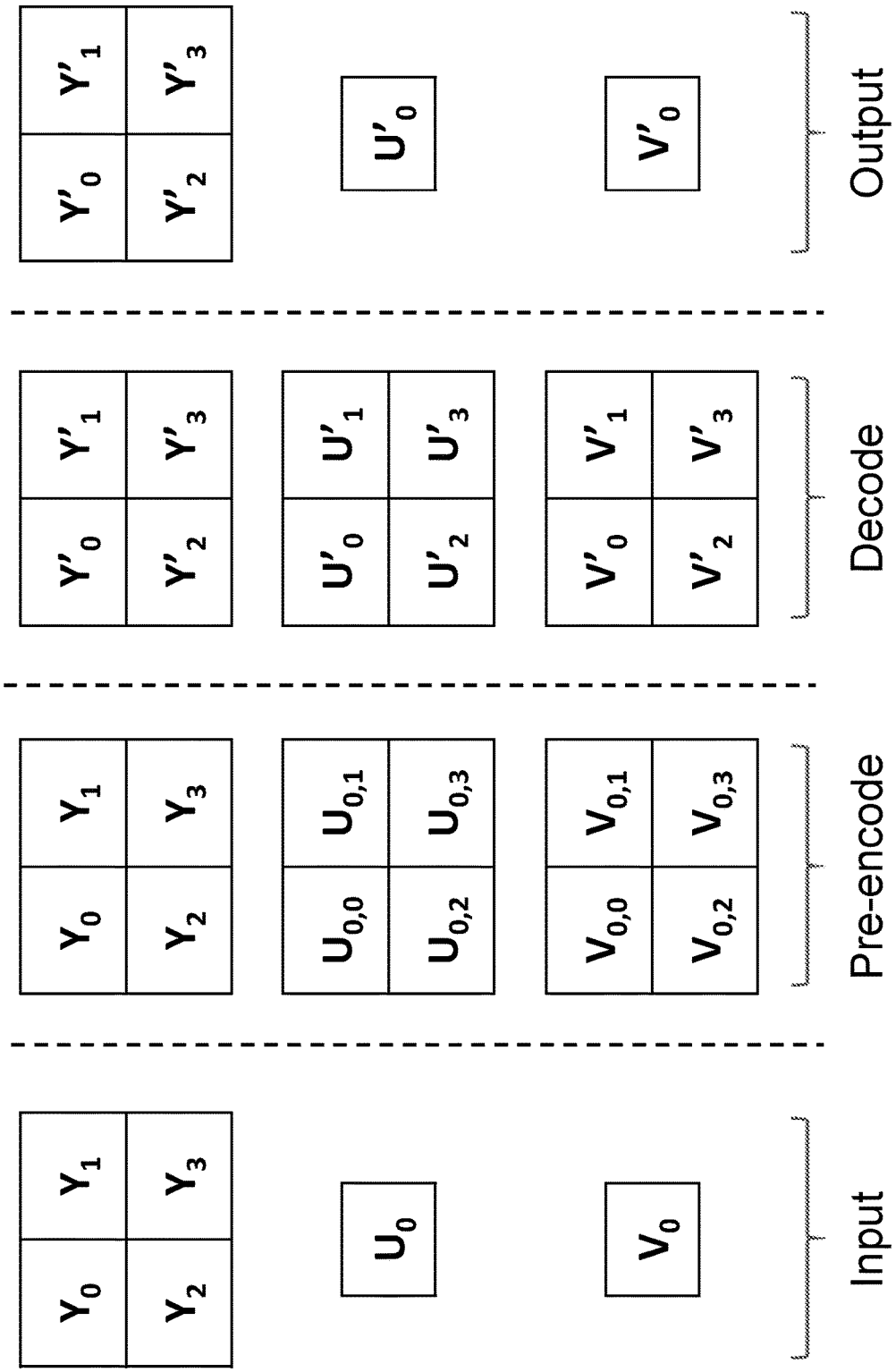
FIG. 8 illustrates the processing of a block of pixels conforming to the 4:2:0 sampling scheme, to be encoded with the palette coding mode.

FIG. 8 illustrates how a 4:2:0 content is processed to apply the palette coding mode as currently known. A similar approach may be used to process any other sub-sampled content (i.e. different from 4:4:4 content)

The Figure illustrates a 2×2 input block of pixels, represented under the 4:2:0 Chroma sampling scheme, according to which a 2×2 block of Luma samples or values $Y_0$-$Y_3$ and two Chroma samples or values $U_0, V_0$ (one per Chroma colour component) are provided. The 2×2 input block of pixels is therefore represented as the input set of samples $\{Y_0, Y_1, Y_2, Y_3\}$ and $U_0/V_0$, meaning that pixel 0 has three colour components $Y_0 U_0 V_0$ and each of pixels 1,2,3 has a single Luma component $Y_{1-3}$ due to the Chroma subsampling. Pixel 0 is said to be non-sub-sampled, while each of pixels 1,2,3 is said to be a sub-sampled pixel, i.e. an input pixel that includes a main pixel component $Y_{1-3}$ but has secondary pixel components $U_{1-3}/V_{1-3}$ missing.

This block is the input block received by the encoder to encode it, in particular using the palette coding mode. Note that the output block or set of samples (right part of the Figure) should consequently follow the same 4:2:0 Chroma sampling scheme.

The normative parts of the palette coding mode are provided for a 4:4:4 "Decode" block of pixels, on which a subsampling should be applied in order to obtain a sub-sampled (4:2:0 or the like) "output" block as shown in the Figure, at the decoder side. Although not defined in the standard, a symmetrical and reverse operation should thus be performed at the encoder side on the input block that has the same sampling scheme as the output block: the input block or set of samples, no matter it is conforming to a 4:2:0 or 4:2:2 sampling scheme, is up-sampled into a so-called pre-encode block or set of samples conforming to the 4:4:4 sampling scheme, as shown in the Figure. It means that the pre-encode block has no subsampling of the colour components forming the pixels (e.g. Chroma component) and each pre-encode pixel has all the main Y and secondary U,V pixel components.

For the 4:2:0 Chroma sampling scheme of the present example, secondary component values $U_{0,1}, U_{0,2}, U_{0,3}$ and $V_{0,1}, V_{0,2}, V_{0,3}$ may be set to $U_{0,0}$ and $V_{0,0}$ respectively when up-sampling the input pixel block.

The "Decode" block of pixels or set of samples shown in the Figure, which conforms to the 4:4:4 sampling scheme, is the result of the palette coding mode, i.e. after encoding and decoding using the palette coding mode. In other words, this is the block that is obtained by the decoder when processing the decoding of the bitstream. The "Decode" block or set of samples represents what the palette coding mode in HEVC handles internally, before it takes into account the Chroma sampling scheme of the input or output; typically, both the encoder and decoder have that version of the block of pixels.

The colour component values of the "Decode" block of pixels may differ from the values of the "Pre-encode" or "Input" blocks, in particular in case of lossy compression: for instance $Y'_0$ may differ from $Y_0$. In case of lossless encoding in the prior art, the Decode block of pixels should perfectly matches the Pre-encode block of pixels.

As the input Chroma format is not 4:4:4, the output Chroma format must not be 4:4:4 but must conform to the same sampling scheme as the input block. As a consequence, the $\{U'_0, U'_1, U'_2, U'_3\}$ and $\{V'_0, V'_1, V'_2, V'_3\}$ values of the Decode block or set of samples must be down-sampled into the input sampling scheme. To achieve this, the decoder (and corresponding encoder in the decoding loop) discards well-defined Chroma values.

For the 4:2:0 Chroma sampling scheme of the present example, $U'_1, U'_2, U'_3$ and $V'_1, V'_2, V'_3$ values are discarded, and only $U'_0$ and $V'_0$ values are kept. The "Output" block of pixels as shown in the Figure is thus obtained, which corresponds to the final output version of the "Input" block.

The above shows the process for applying the palette coding mode in case the input block of pixels conforms to an input sampling scheme having subsampling of at least one colour component, the secondary pixel components, here Chroma components. In particular, from among the component values handled internally by the palette coding mode, some are discarded at the end to obtain the output block of pixels.

In operation, the palette coding mode actually encodes the sets of samples $\{Y_0, U_{0,0}, V_{0,0}\}, \{Y_1, U_{0,1}, V_{0,1}\}, \{Y_2, U_{0,2}, V_{0,2}\}$ and $\{Y_3, U_{0,3}, V_{0,3}\}$. Ideally, $U'_0$ is as close as possible to $U_0$, and thus so is $U_{0,0}$. The known techniques conventionally use $U_0$ and $V_0$ values to set $U_{0,1}/U_{0,2}/U_{0,3}$ and $V_{0,1}/V_{0,2}/V_{0,3}$ values for the pre-encode block or set of samples. Then, the internal operations of the palette coding mode consider all of the pre-encode values with the same importance, because the palette coding mode does not make distinction between original input pixel component values and those that are generated by the up-sampling process from the input block to the pre-encode block.

Figure 9:
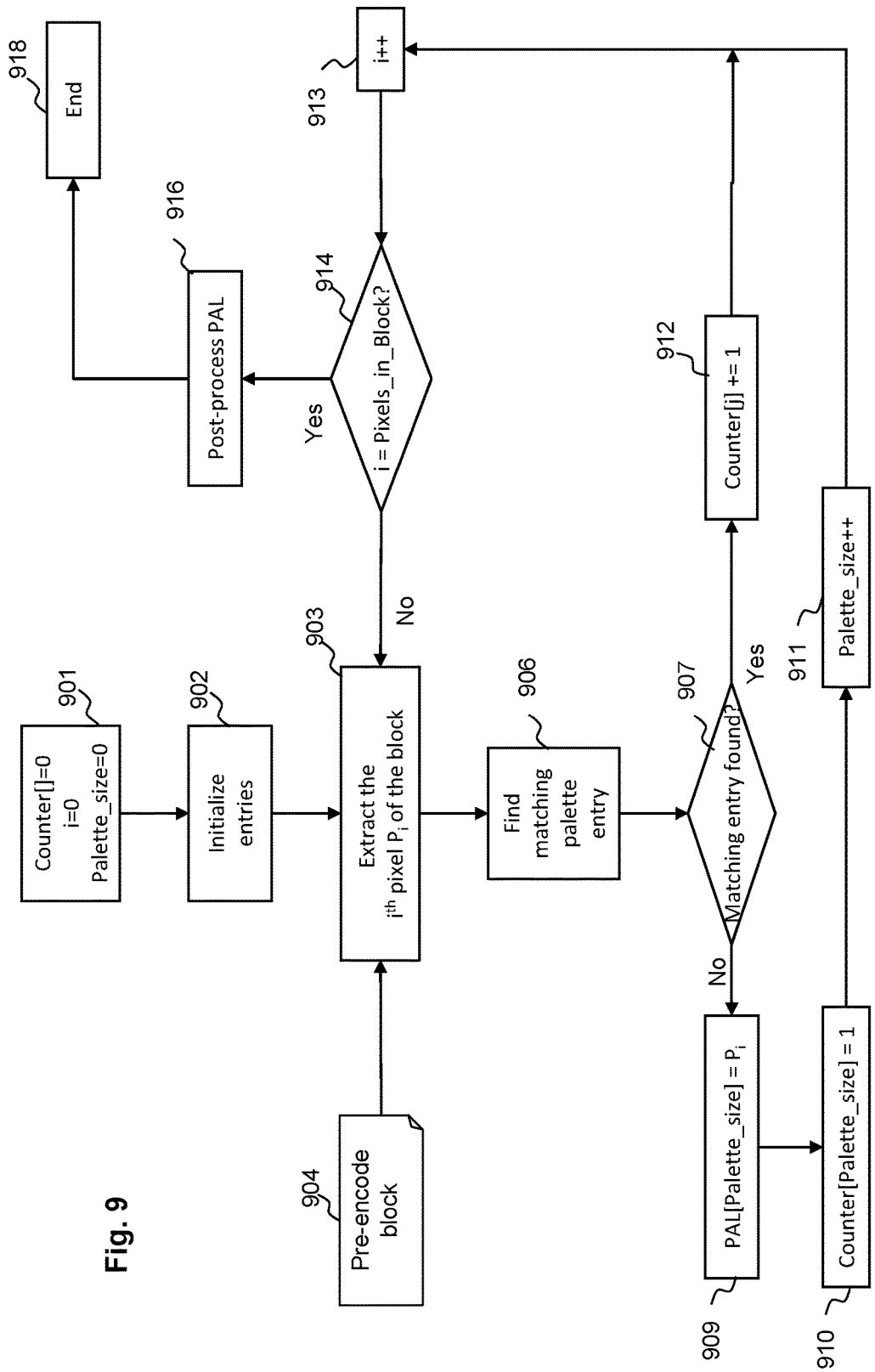
FIG. 9 illustrates a lossless palette determination algorithm at the encoder.

FIG. 9 illustrates an exemplary palette determination algorithm at the encoder according to co-pending UK patent application No 1517479.0 not yet published if it is adapted to lossless encoding. In this algorithm, the palette is built by iteratively considering each pre-encode pixel and adding a palette entry to the palette when no yet-existing palette entry (in the palette) fully matches the pre-encode pixel currently considered.

The input data of this process are the pre-encode block of pixels and its coding unit size. Knowledge of the input block or the input sampling scheme is also required in order to know which colour component values of the pre-encode block are discarded secondary component values according to the normative discarding step described in FIG. 8.

At a first step 901, a variable i representing a pixel counter is set to 0, a variable "Palette_size" to follow the growth of the palette as it is being built is also set to 0 and an array of sums of occurrences (i.e. entry hits), Counter[ ] with as many entries as the number of entries in the palette, is initialized to 0.

Next, at step 902, the palette may be initialized, for instance using a palette predictor or a previous known palette (see below explanation of FIG. 14).

An exemplary initialization process may reproduce steps 903 to 914, excluding steps 909 to 911, as described below using palette predictor 560 instead of the palette PAL when searching for a matching entry (in step 906 and 907). In this way, the number of times a palette predictor entry is used can be determined. PAL[ ] is then initialized with the palette predictor entries whose number of occurrences is different from 0 or above a predefined threshold. Palette_size is also initialized with the number of palette predictor entries kept, less one. This approach makes it possible to obtain, in the initialized palette PAL predictable entries, which may otherwise not be present in the final palette. In any case, if Counter[ ] contains occurrences, its content is reset to 0 so as to properly count the number of occurrences in the following steps.

Next to step 902, step 903 is performed during which the pixel $P_i$, i.e. having the index i according to a scanning order and pixel components Yi, Ui, Vi, is read from the pre-encode block of pixels 904.

Next, step 906 determines the level, i.e. a palette entry, to lossless describe current pixel $P_i$, i.e. a palette entry that exactly matches all components of $P_i$. Such a matching can be evaluated using a distance or a distortion metric which is binary, i.e. which takes either a minimum value in case of perfect matching or a maximum value in case of no matching.

Embodiments of the present invention focus on step 906 and provide adaptations in order to take into account the cases of sub-sampled pixels, i.e. where the Chroma values are discarded during decoding. These adaptations are explained below with reference to FIG. 10 and provide a substantially different distortion metric, because it should allow non-minimum and non-maximum distortion values to be used whereas the encoding is lossless.

In case no satisfactory palette entry is found at step 906 (test 907 is negative), current pixel $P_i$ is added to the palette (noted PAL[ ] in the Figure) as a new palette element or entry, at step 909.

Step 909 means that the palette entry at index "Palette_size" is set equal to the value of current pixel $P_i$, and current pixel $P_i$ becomes a new element in the palette, with index Palette_size associated with it. More precisely the following assignment may be performed:

$PAL_Y$[Palette_size]=($Y_i$);

$PAL_U$[Palette_size]=($U_i$); and $PAL_V$[Palette_size]=($V_i$)

where $PAL_{Y,U,V}$ are three tables to store the colour values.

Current pixel $P_i$ is thus associated with the new palette entry.

At step 910, the number of pixels Counter[Palette_size] associated with the newly added palette entry PAL[Palette_size] is set to 1.

Next, step 911 increments the Palette_size variable to indicate that the palette has grown by one new entry. Next step is step 913.

In case a satisfactory palette entry 'i' is found at step 906 (test 907 is positive), step 912 occurs in which current pixel $P_i$ is associated with palette entry 'i', and the variable Counter[j] is increased by one.

Next, the variable "i" is incremented by one at step 913 to consider the next pixel "i" of the current pre-encode block. When all the pixels have been considered (test step 914), an optional post-processing 916 of the palette may be performed.

Such post-processing may include adding or removing one or more palette entries. For instance, the palette entries having too few hits (i.e. the number of pixels Counter[j] is low) may be deleted.

The post-processing may also include predicting the palette from palette predictor 560. For instance, each palette entry PAL[j] that matches an entry in the palette predictor may be replaced by a reference to the palette entry predictor.

As described below with reference to FIG. 12, embodiments of the invention improve the prediction in case of lossless encoding.

Referring back to FIG. 8, as the Chroma samples values of pixels 1 to 3, $U_{0,1}/U_{0,2}/U_{0,3}$ and $V_{0,1}/V_{0,2}/V_{0,3}$, are discarded at the end to produce the decoded output image, it is assumed their value has little to no importance. It means that conventional approaches, when considering all the pixel component values with the same importance, perform suboptimal encoding.

To illustrate this in the case of lossless encoding, a plurality of pre-encode pixels that have the same Luma component value (main pixel component) but different reconstructed Chroma component values (secondary pixel components) should be encoded using different (and fully matching) palette entries. In practice, this substantially increases the number of entries in the palette, thereby increasing the bit costs of encoding the levels (or indexes).

The present invention intends to reduce this drawback in the case of lossless encoding.

To achieve that embodiments of the present invention provide that encoding the pre-encode block during the lossless encoding of the block of pixels includes encoding at least one pre-encode pixel that corresponds to a sub-sampled input pixel, using a palette entry different from the pre-encode pixel. In other words, the 4:4:4 encoding of the pre-encode block allows the pixels corresponding to sub-sampled input pixels (i.e. with secondary components missing) to be coded using non fully-matching palette entries.

Intuitively, this approach should introduce some losses, which is contrary to the core requirement of lossless encoding. However and counter-intuitively, since these losses may only affect/impact the discarded pixel components, they do not provide any loss in the decoded output 4:2:0 or the like image compared to the original 4:2:0 or the like image.

This approach may thus be used when encoding the pre-encode pixels once the palette has been built. However it may also be used when building the palette, as explained now with reference to FIGS. 10 to 13.

Figure 10:
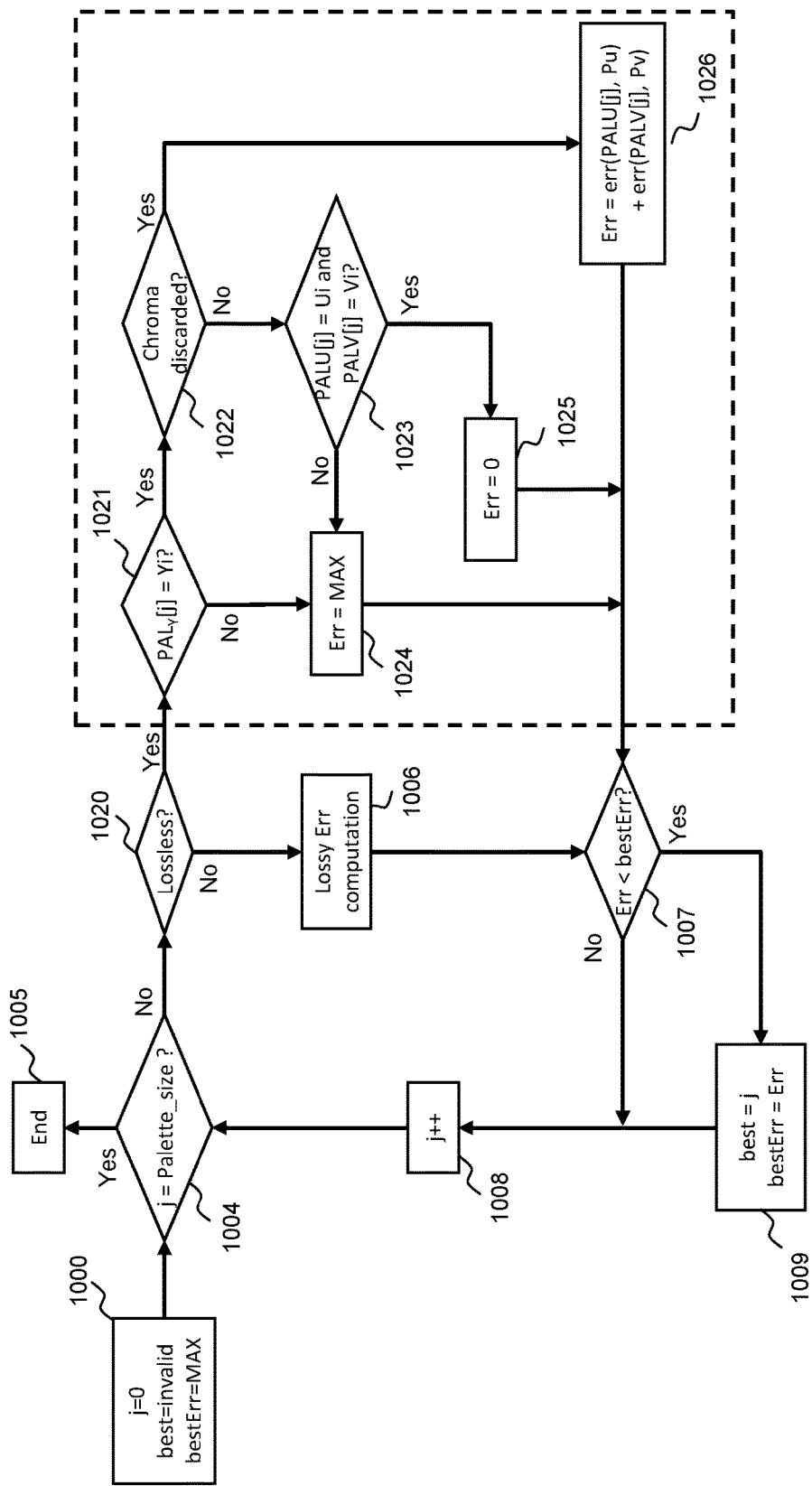
FIG. 10 illustrates a search algorithm for searching a palette entry at the encoder for a current pixel, in case of both lossy and lossless encodings, according to embodiments of the invention.

Turning now to FIG. 10, the selection for lossless encoding of a relevant palette entry for current pixel $P_i$ taking into account whether the Chroma values of the pixel is discarded or not, and thereby being actually lossy encoded is described. This selection is also known as the palettizing of a pixel, i.e. when mapping a pixel to an entry of the palette.

The algorithm of FIG. 10 seeks to find the palette entry that minimizes distortion with current pixel $P_i$ whose component values are Yi,Ui,Vi, as presented in FIG. 9. This algorithm may be implemented during actual encoding of the pixel (after the palette has been built), for instance when generating the array of indexes 602 in FIG. 6, or during the building of the palette, for instance when finding a matching palette entry (step 1106 of FIG. 11 that corresponds to step 906 when implementing embodiments of the invention).

Note that step 1006 condenses steps suited for lossy encoding, not relevant to this invention, for instance as described in co-pending UK patent application No 1517479.0 or in the prior art mentioned therein.

Specific processing according to embodiments of the invention are located in steps 1020 to 1025, suited for lossless coding.

At step 1000, the current pixel $P_i$ being known, the search is initialized: the first palette entry PAL[j] is selected by setting the variable "j" to 0, the current best entry variable "best" is set to a value indicating no valid entry (e.g. −1) and the distortion variable "bestErr" for current best entry is set to the maximum value. This allows those variables to be set to the first palette entry considered, upon performing the following loop for first time.

Next, step 1004 checks whether the last entry of the palette has been evaluated. If it is the case, the processing ends at step 1005.

Otherwise, step 1020 checks whether the encoding should be lossless. This is based for instance on a coding parameter set in the encoder, for instance specified by an operator or user.

If it is not the case, the processing for lossy encoding is performed at step 1006, during which a distortion error may be evaluated between current pixel $P_i$ and PAL[j] currently considered. Here determining a palette entry for the pre-encode pixel currently considered is for example performed by evaluating a distortion measure between the pre-encode pixel and at least one palette entry using weighted values of colour components of the pre-encode pixel. The distortion measure or error "Err" (which may be the absolute difference for L1 distance or the squared error for L2 distance) is computed for each colour component YUV.

The next step is step 1007.

If the coding is lossless, step 1021 checks whether the entry Luma $PAL_Y[j]$ is equal to the pixel luma Yi. In other words, it is checked whether or not the palette entry under consideration PAL[j] has the same main pixel component or components (Luma in the example) as the pre-encode pixel $P_i$ currently considered.

If it is not the case, this entry cannot be used to represent or encode $P_i$. As a result, a distortion score, "Err", is set to a maximum value MAX at step 1024. The metric used here thus provides a maximum score if the main pixel component or components of the pre-encode pixel and of the palette entry considered PAL[j] do not match. The next step is step 1007.

If the main pixel components, such as the Luma components, match at step 1021, step 1022 checks whether the secondary pixel components, here the Chroma components, for current pixel $P_i$ are discarded in the corresponding Input block. In other words it is checked whether or not current pixel $P_i$ corresponds to a sub-sampled input pixel. This may be based on the parity of the pixel coordinated in the image, for instance the odd abscissa or odd ordinate of the current pixel for 4:2:0 sampling scheme; and the odd abscissa of the current pixel for 4:2:2 sampling scheme.

If not, the secondary pixel components, i.e. Chroma components, must match with the ones of palette entry PAL[j] for the latter to be usable. Thus, step 1023 compares respectively $PAL_U[j]$ and $PAL_V[j]$ to respectively Ui and Vi.

If they are equal, i.e. if all the pixel components of the pre-encode pixel match the palette entry, Err is set to a minimum score (usually 0, i.e. no distortion) at step 1025. The next step is step 1007.

Otherwise, palette entry PAL[j] cannot be used and thus a maximum score is provided at step 1024 previously described. The metric used here thus provides a maximum score if the pre-encode pixel corresponds to a non-sub-sampled input pixel and does not fully match the palette entry.

If current pixel $P_i$ corresponds to a sub-sampled input pixel (i.e. the Chroma components are discarded in the corresponding input pixel), palette entry PAL[j] can be used to represent current pixel $P_i$ whatever the secondary pixel components $PAL_U[j]$ and $PAL_V[j]$ of the palette entry.

Step 1026 is thus executed, during which the distortion score Err is calculated to represent a distortion over the secondary pixel components, here the Chroma components, between $P_i$ and PAL[j]. In other words, the metric provides, in that case, a non-zero score representing a distortion measure between the secondary pixel component or components of the pre-encode pixel and the corresponding secondary pixel component or components of the palette entry considered.

As shown in the Figure, Err may be equal to err($PAL_U[j]$, $U_i$)+err($PAL_V[j]$, $V_i$). Note, that the distance Err between $P_i$ and PAL[j] be based on an L1 distance or a L2 distance between their colour component values.

In yet another embodiment, Err can be computed on step 1026 using various clamping methods. One such embodiment is to set it to 0 if below a threshold, otherwise to 1. Furthermore, the criterion can be applied independently on each chroma component, e.g. requiring that only one, or both values err($PAL_U[j]$, $U_i$) and err($PAL_V[j]$, $V_i$) are below said threshold. This has the benefit of selecting the first usable index, except if an index matching the pixel (save rounding errors) can be found. As a consequence, the shortest index codewords can be used to represent the pixel, unless there is a sufficient match, in which case, index prediction may allow better coding of the index to which the pixel is mapped.

The distortion measure or score is then compared to the distortion "bestErr" of the currently best entry (test 1007). If it is lower, then the best entry is updated by setting "best" to "j" (i.e. to save the palette entry currently considered) and "bestErr" to "best" at step 1009. Next, step 1008 selects the next palette entry by incrementing "j". The loop to step 1004 makes it possible to successively test all the palette entries of the palette for current pixel $P_i$, using the metric defined above. The output of the palette entry selection process is PAL[best].

Note that, in one embodiment, the loop can be stopped earlier for instance as soon as bestErr=0 (or the minimum distortion value). This is because no better entry can be found. The selected palette entry is thus this palette entry the distortion score of which is 0.

In a variant to selecting the palette entry with bestErr, steps 1007 and 1009 may be avoided. The process described above makes it possible to obtain, and store, a distortion score for each palette entry given current pixel $P_i$. Other distortion scores may thus be obtained and stored for the other pre-encode pixels of the pre-encode block currently considered. Thanks to the metric used, a rate/distortion analysis of using the various possible palette entries for the pre-encode pixels given their distortion scores may be conducted once on the whole pre-encode block, in order to select, for each pre-encode pixel, the most efficient palette entry to be used. In an optional approach, the distortion scores obtained at step 1026 may be forced to 0 before the rate/distortion analysis. This is because the inventors have found slight rate improvements can be obtained in some situations.

Other embodiments may contemplate ending (step 1005) the process just after positive verification of step 1022 (in case the secondary components are actually discarded in the corresponding input pixel) or after step 1025 or 1026. This is to have a faster determination of a relevant palette entry.

For a pre-encode pixel that corresponds to a sub-sampled input pixel, it means that the palette entries of the palette are successively considered, and the first considered palette entry that has the same main pixel component or components as the pre-encode pixel is selected.

This is because after each of these three steps, a palette entry matching the necessary and relevant pixel components of $P_i$ has been found (for step 1022 or 1026, this is a matching for only the main pixel component; for step 1025, this is a matching for all the pixel components, including the main and secondary ones).

Referring again to FIG. 8, it has been seen that usually $U_{0,1}$, $U_{0,2}$, $U_{0,3}$ and $V_{0,1}$, $V_{0,2}$, $V_{0,3}$ are set to $U_{0,0}$ and $V_{0,0}$ respectively when up-sampling the input pixel block. Due to the invention, each of pixels 1,2,3 may be encoded using a palette entry the value of which is different from the pixel value. In other words, the secondary pixel components may be lossy encoded and $U'_1$ may be different from $U_{0,1}$, $U'_2$ may be different from $U_{0,2}$, and so on. As a result, while $U_{0,1} = U_{0,2} = U_{O3}$, the invention may result in having $U'_1 \neq U'_2 \neq U'_3$.

As described above with reference to FIG. 10, a distortion measure or metric is provided that is mainly based on the sampling scheme used for the input block, i.e. based on the pixel components that are discarded or not in the input pixels and thus discarded anew for the output block of pixels.

Properties may thus be defined based on whether or not the pre-encode pixels correspond to sub-sampled input pixels or to non-sub-sampled pixels. For the description below, property $PROP_i$ is defined to indicate whether pre-encode pixel $P_i$ corresponds to a sub-sampled input pixel: $PROP_i=1$ if the input pixel corresponding to $P_i$ has no secondary (Chrome) pixel components, and $PROP_i=0$ if the corresponding input pixel is not sub-sampled. In 4:2:0, $PROP_i=1$ if the pixel has an odd abscissa or an odd ordinate. In 4:2:2, $PROP_i=1$ if the pixel has an odd abscissa.

Also property PROP[j] indicates whether palette entry PAL[j] is used to represent (i.e. associated with) only pre-encode pixels corresponding to sub-sampled input pixels. In other words it determines whether all the pixels mapped onto palette entry PAL[j] have their Chroma discarded (in the corresponding input pixel). PROP[j]=1 if all the associated pixels correspond to sub-sampled pixels. PROP[j]=0 if one or more associated pre-encode pixels have not their Chroma discarded in the corresponding input pixels.

One will directly understand that the secondary pixel components of PAL[j] with PROP[j]=1 are useless, because they are used only to encode pixel components that will be discarded to generate the decoded output image.

Figure 11:
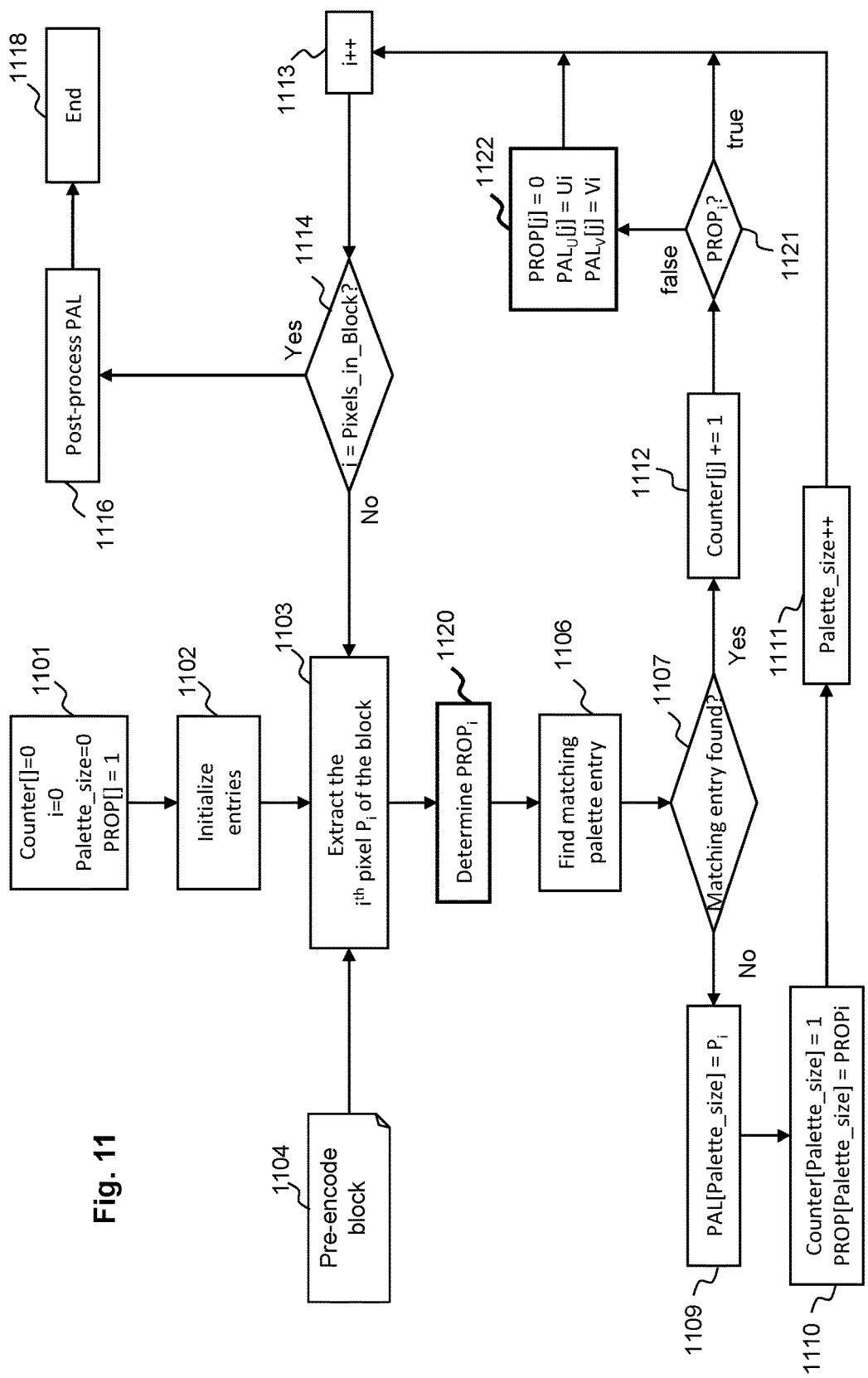
FIG. 11 illustrates a lossless palette determination algorithm at the encoder, according to embodiments of the invention.

FIG. 11 describes a palette determination algorithm for lossless encoding at the encoder, according to embodiments of the invention, using such properties.

This algorithm may use the distortion metric of FIG. 10. Consequently, the steps are equivalent between FIG. 9 and FIG. 11, except steps 1120 to 1122 that are new steps related to embodiments of the invention, and steps 1101, 1106 and 1110 that are modified.

To track whether a palette entry is only associated with pre-encode pixels whose Chroma is discarded in the corresponding input pixel, the initialization step 1101 further comprises initializing that property to 1 (true) for all entries, corresponding to the PROP[ ] array.

When considering current pixel $P_i$ after step 1103, step 1120 is performed to obtain $PROP_i$ for $P_i$ in order to efficiently conduct the palette entry search of step 1106 as described above with reference to FIG. 10. Indeed, $PROP_i$ makes it possible to quickly perform test 1022: if $PROP_i=1$, test 1022 is positive; if $PROP_i=0$, test 1022 is negative.

As mentioned above, the search evaluates a matching between a palette entry PAL[j] and the pre-encode pixel currently considered $P_i$. When $P_i$ corresponds to a sub-sampled input pixel ($PROP_i=1$), the matching can be evaluated between only the main pixel component or components (i.e. Luma components) of $P_i$ and of PAL[j]. Also, in the other cases, the matching can be evaluated between all the main and secondary components of $P_i$ and of PAL[j].

A slight adaptation may simplify the matching evaluation when $P_i$ does not correspond to a sub-sampled input pixel ($PROP_i=0$) and all the pre-encode pixels already associated with PAL[j] correspond to sub-sampled input pixel or pixels, i.e. when PROP[j]=1. In particular, the matching can be evaluated between only the main pixel component or components (i.e. Luma components) of $P_i$ and of PAL[j]. This is because, as explained below with reference to step 1122, the secondary pixel components can be forced to take the value of $P_i$, thereby ensuring PAL[j] to fully match the whole $P_i$ (as required by steps 1022 and 1023 to enter step 1025 identifying the best palette entry).

Yet another adaptation is to define step 1107 as testing whether $PROP_i$ or PROP[j] is false (=0). This is because in both cases a mismatch between their secondary (Chroma) pixel components is not important. However and in particular, if $PROP_i$ is 0 (false), but PROP[j] is 1 (true), then pixel $P_i$, whose secondary pixel components are discarded in the corresponding input pixel, can be associated with a palette entry having different secondary pixel components, in which case a merger of entries is proposed in step 1122 described below, to avoid lossy decoding for $P_i$.

In case no matching palette entry is found, step 1109 applies similar to step 909. In addition, at step 1110, if a new entry must be added at the end of the palette, i.e. at position Palette_size, its property PROP[Palette_size] is set to the value of PROPi.

In case a matching palette entry PAL[j] is found at step 1107, step 1121 checks whether $PROP_i$ is 0 (false), in which case palette entry PAL[j] can be forced to match Pi at step 1122 without loss for the other pixels already mapped onto palette entry PAL[j]. This is because, either PAL[j] before modification is different from $P_i$ and then all the pixels already associated with PAL[j] correspond to sub-sampled input pixels (thus the secondary components of which are meaningless), or PAL[j] equals $P_i$ in which case step 1122 provides no change.

It is possible that $PAL_U[j]$ and $PAL_V[j]$ differ respectively from Ui and Vi. The secondary components (Chroma) of PAL[j] is modified to be equal to corresponding secondary components of the current pixel during step 1122. In addition, as $P_i$ secondary components are not discarded ($PROP_i$=0 at test 1121), but are mapped onto PAL[j], then the latter no longer has only pixels whose secondary components are discarded. Therefore its property PROP[j] is set to 0 (false). In addition, if $PROP_i$ and PROP[j] are both 0 (false), it means that PAL[j] is already equal to $P_i$, in which case 1122 provides no change to the property of the entry j of the palette.

Also, when both PROP[j] and $PROP_i$ are true, then neither secondary (Chroma) pixel components of PAL[j] and $P_i$ is important, it has been proposed above to keep $PAL_U[j]$ and $PAL_V[j]$ unchanged (i.e. equal to the first pixel used to create the palette entry). In variants, an update of the useless secondary components may be contemplated, for instance an averaging of their secondary pixel components, e.g. PALU [j]=($PAL_U[j]+U_i$)/2. Other modifications can be contemplated, like an average over all pixels mapped to the entry, weighted or not.

This approach avoids creating a new palette entry if one palette entry the secondary (Chroma) components of which can be modified (because PROP[j]=1) is available. It can be summarized as follows when considering a current pre-encode pixel corresponding to a non-sub-sampled input pixel, i.e. $P_i$ with $PROP_i$=0. The building of the palette comprises:

identifying a matching palette entry PAL[j] already associated with only pre-encode pixel or pixels that correspond to sub-sampled input pixel or pixels (i.e. PROP[j]=1), the matching defining a matching between only the main pixel component or components of $P_i$ and of PAL[j], and forcing the pixel components of the palette entry to the pixel components of the current pre-encode pixel.

The above is performed for each pre-encode pixel thanks to the loop and test 1114.

Once all the pre-encode pixels have been considered, post-processing 1116 is performed, an example of which is now described with reference to FIG. 12 focusing on predicting the palette as built using palette predictor 560.

Figure 12:
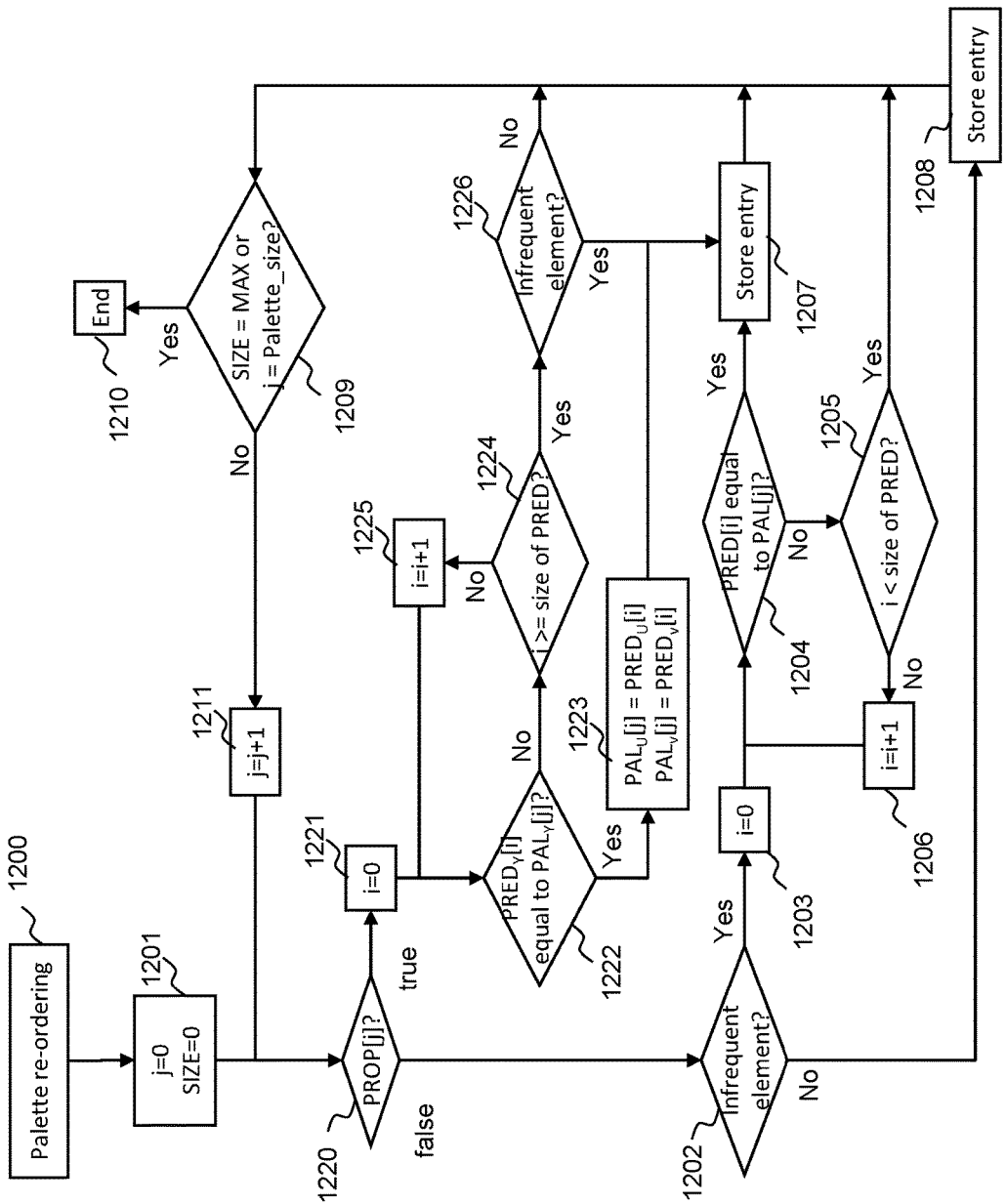
FIG. 12 illustrates an algorithm of palette prediction at the encoder, which may be implemented in the process of FIG. 11, according to embodiments of the invention.

FIG. 12 describes an exemplary post-processing of the palette built, in particular when determining whether a palette entry predictor may be used instead of a palette entry.

Usually, the opportunity to replace a palette entry by a palette entry predictor is evaluated by evaluating a distortion measure between at least one pre-encode pixel associated with the palette entry and at least one palette entry predictor, in case of lossy encoding.

FIG. 12 illustrates an algorithm of palette prediction at the encoder, according to embodiments of the invention for the case of lossless encoding.

Initial step 1200 is an optional palette re-ordering step. For instance, it may consist in ordering the palette entries (and their associated properties) of the input palette according to a decreasing order of occurrences as provided by Counter[j] obtained during the process of FIG. 9 or 11. This is to process the most used palette entries in priority when performing the step below. This is because the output palette obtained at the end of the process of FIG. 12 may not contain all entries of the input palette, and thus should keep only the most useful entries for increased efficiency.

Steps 1201 to 1211 provide post-processing that is truly lossless, while steps 1220 to 1224 are more specific to embodiments of the invention benefiting from the PROP[ ] array defined above.

Step 1201 initializes the post-processing operation by setting the output palette size SIZE to 0 and an entry index "j" to 0 to successively consider each current palette element PAL[ ] (or entry).

For the current palette entry PAL[j], step 1220 checks whether the pre-encode pixels mapped onto this entry correspond to sub-sampled input pixels having no secondary (or Chroma) components, i.e. whether PROP[j]=1 or not.

If palette entry PAL[j] is associated with only pre-encode pixel or pixels that correspond to sub-sampled input pixel or pixels (PROP[j]=1), step 1221 is executed during which the first entry of palette predictor 560 (palette entry predictor) is selected by setting an iteration variable "i" to 0.

Step 1222 is conducted to check whether the main pixel component or components of PAL[j] perfectly matches the corresponding main pixel component or components of palette entry predictor 'i'. In other words, it is determined whether or not the current palette predictor entry 'i' is similar to the current palette entry PAL[j] regarding their Luma components.

If the Luma components or main components are similar, step 1223 forces the palette entry PAL[j] to the values of the matching palette entry predictor T. In other words, step 1223 sets the Chroma values of the current palette entry PAL[j] to those of the current palette predictor entry 'i'.

The palette entry thus modified is stored into the output palette, whose size SIZE is incremented at step 1207, before going to step 1209.

If the Luma or main components are not similar, the next palette predictor entry 'i' is tested through the loop 1224 (testing if all the palette predictor entries have been tested) and 1225 (incrementing 'i').

When all the last palette predictor entries have been considered without success (output yes at test 1224), the current palette entry is not predictable.

The inventors have found that such a palette entry for pre-encode pixels with $PRED_i$=1 (corresponding to only sub-sampled input pixels) needs to be used more often than palette entries for pre-encode pixels with $PRED_i$=0 to yield a coding gain. Therefore, next step 1226 checks whether palette entry PAL[j] is relatively infrequent. For instance, the associated variable Counter[j] is compared to a predefined threshold depending on the sampling scheme used, for instance to 4 for 4:2:0 sampling scheme and 3 for 4:2:2 sampling scheme.

If it is lower than said threshold, palette entry PAL[j] is infrequent and thus discarded, and the process goes directly to step 1209.

Back to step 1220, if palette entry PAL[j] is associated with at least one pre-encode pixel that correspond to a non-sub-sampled input pixel (PROP[j]=0), steps 1202-1208 are executed to determine a truly lossless palette entry predictor for current palette entry PAL[j], if any.

Step 1202 checks whether PAL[j] is infrequent or not, for instance whether Counter[j] is less than 2 or not. If two or more pre-encode pixels are mapped onto this palette entry, this palette entry can be kept which is done by storing it as an addition entry into the output palette at step 1208, the size SIZE of which being incremented before going to step 1209.

If PAL[j] is infrequent, steps 1203 to 1207 are executed to find whether PAL[j] can be predicted or not. This is done by testing successively each entry of the palette predictor using variable 'i' (initialized at step 1203 and incremented at step 1206) through the loop 1204-1206. Due to the lossless constraint, step 1204 consists in checking whether PAL[j] strictly matches to the palette predictor entry currently considered or not.

In case of matching, the current palette entry is stored in the output palette at step 1207, where the palette size SIZE is incremented, before going to step 1209. Otherwise, step 1205 checks whether all the palette predictor entries have been considered, in which case PAL[j] is not predictable and thus discarded from the palette by going directly to step 1209.

At step 1209, it is checked whether or not PAL[j] is the last palette entry (i.e. whether j is Palette_size) or the output palette is full (given a maximum size).

If at least one of the two conditions is met, the output palette has been built and the processing ends at step 1210. Otherwise, the next entry in the input palette is selected by incrementing variable "j" before looping back to step 1220.

The man skilled in the art will contemplate the similarities of that loop with respect to FIG. 10: FIG. 12 runs a similar matching to FIG. 10, except between a palette entry and the palette predictor entries. Similarly, instead of ending immediately at step 1222 (as described above for steps 1022 and 1005), another embodiment may measure a similar distortion between the current palette entry and the palette predictor entries, and perform a step similar to step 1223 by replacing current palette entry with the palette predictor entry having the lowest distortion. It may be recalled that the early termination induces bitrate reduction, mainly because the signaling of the prediction of the current palette is reduced.

The combination of the processes of FIGS. 10, 11 and 12 makes it possible to generate a palette using the teachings of the invention. This combination may be implemented in a more general process for obtaining an optimal palette to actually encode the current pre-encode block.

Figure 13:
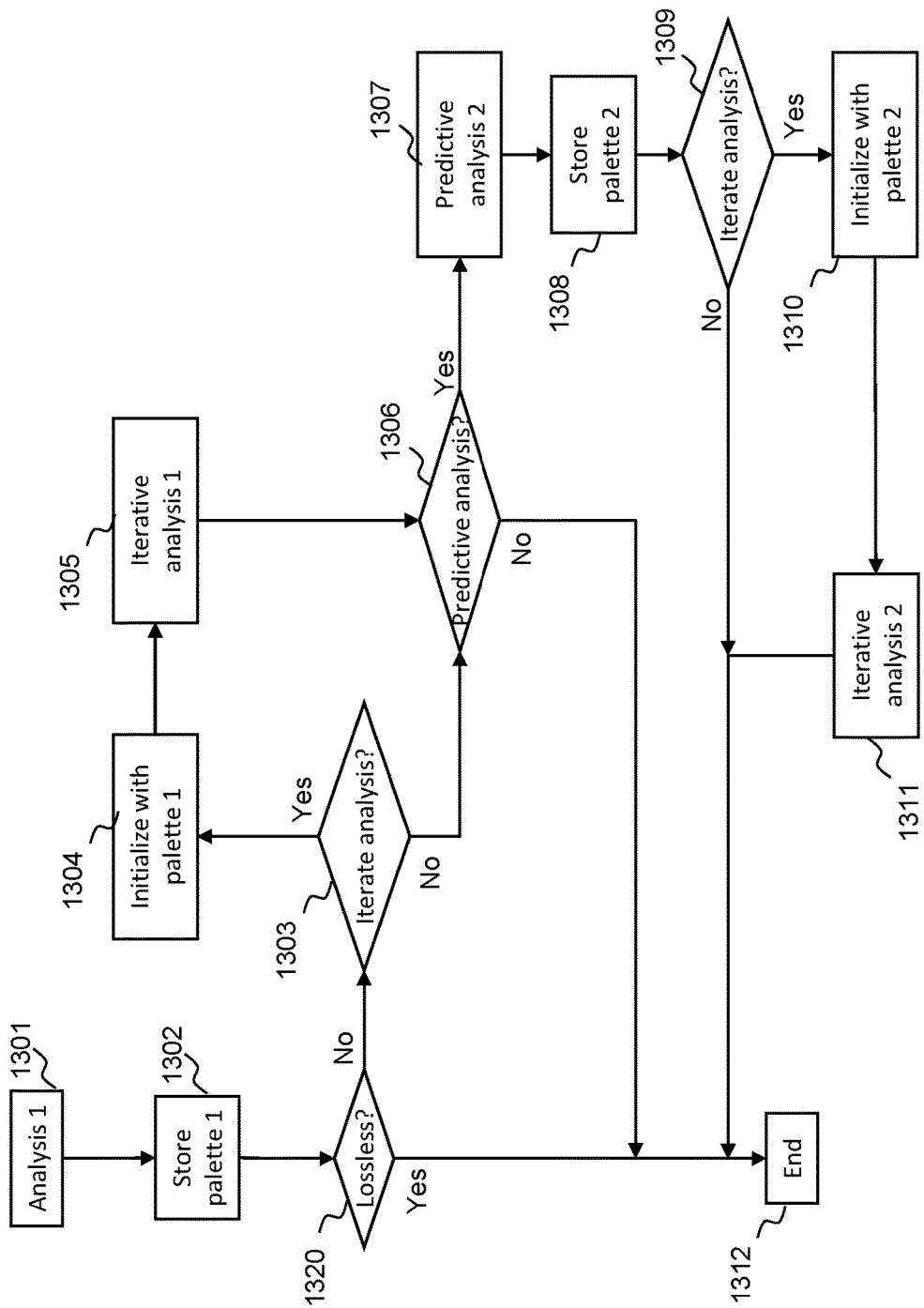
FIG. 13 illustrates a high-level algorithm involving possibly several analyses to obtain the best palette for use.

An example of such more general process is shown in FIG. 13, representing an encoder algorithm to obtain the best palette for a CU. This algorithm notably provides a fast palette obtaining in case of lossless encoding. This is because, as explained below, step 1320 allows switching off some analysis at a higher level in case of lossless encoding, thus reducing processing costs.

More generally, the process provides iterating one or more time a palette building and predicting process, such as successive steps 1301, 1305, 1307 and 1311 described below. Next, in case the encoding of the blocks of pixels is lossless, iterating only once the palette building and predicting process, in particular by restricting the overall palette generation process to step 1301. In other words, the iterative process is deactivated, and only the first iteration is performed.

The first analysis performed at step 1301 may correspond to an implementation of the palette determination algorithm for lossless encoding of FIG. 11, wherein step 1102 initializes the palette with empty entries. The output palette 1 of the process of FIG. 11 (involving the processes of FIG. 10 and of FIG. 12) is stored at step 1302 for later use, e.g. for generating the bitstream or for the other analyses explained later on. Next step 1320 checks whether the encoder operates in a lossless encoding mode in which case the process simply ends as the output palette 1 does not need to be further optimized for lossless encoding (which may thus occurs at next step 1312 for instance using a rate/distortion criterion as explained above to select the palette entries to actually encode the pre-encode pixels).

In case the encoding mode is a lossy mode, a lossy-specific analysis is conducted to determine the best palette, for instance by minimizing a coding cost due to the use of each of various possible palettes. This lossy-specific analysis does not regard the lossless encoding according to the invention. While it could have been represented by a single block in the Figure, some details are given below for full explanation.

Generally speaking, in case of lossy encoding mode, the palette building and predicting process is iterated two or more times to obtain two or more palette candidates. In the example of the Figures, up to four iterations 1301, 1305, 1307 and 1311 may be performed. Next, one of the two or more palette candidates is selected as the obtained palette, based on a rate/distortion criterion. This is done at step 1312 below.

Thus, in case of lossy encoding mode, step 1303 checks whether an iterative analysis should be performed to refine the palette. Conditions to do so are that a valid palette has been generated at step 1301 and that its size is above a threshold (e.g. two entries), otherwise the potential gain of using it is very small and does not warrant another analysis. If both conditions are not met, the iterative analysis is skipped by going directly to step 1306. Otherwise, the output palette 1, stored at step 1302, is used to initialize (step 1304) a new palette determination of FIG. 11. Step 1304 corresponds to step 1102 when performing the palette determination algorithm of FIG. 11 at step 1305. A new output palette is obtained.

Once done, next step is step 1306 during which it is determined whether or not it is worth performing an analysis optimized for prediction. The condition to do so is that a palette predictor 560 is available and not empty (e.g. the condition is not met and the analysis 2 is skipped for the first palette-coded CU of the slice, since no palette predictor [previous palette used] is available).

If the condition is not met, all analyses have been performed and the process ends at step 1312. Otherwise, a predictive analysis is performed at step 1307 which includes initializing the palette (corresponding to step 1102) with the palette predictor before performing again the palette determination algorithm of FIG. 11 to obtain another output palette 2 which, in turn, is stored during step 1308.

Preferably, the initialization of the palette is made with the palette predictor entries that are actually used in the palette obtained at step 1302 or 1305.

Next to step 1308, step 1309 checks whether a last iterative analysis should be performed to refine again the palette. The same conditions as defined above for step 1303 can be used based on the palette stored at step 1308.

If the conditions are not met, all the analyses have been performed and the process ends at step 1312. Otherwise, the palette stored during step 1308 is used to initialize at step 1310 a last iterative analysis performed at step 1311. Again the analysis 1311 corresponds to the palette determination algorithm of FIG. 11 for which the palette initialization 1102 is performed at step 1310.

Next to step 1311, all the analyses have been performed and the process ends at step 1312. This step may compare all palettes generated for the current CU during any of steps 1301, 1305, 1307 or 1311, using for instance a rate-distortion cost, to select the best-performing one and to use it as the palette to encode the current CU. For lossless encoding, this comparison can be skipped, as only one palette is generated, during step 1301.

Figure 14:
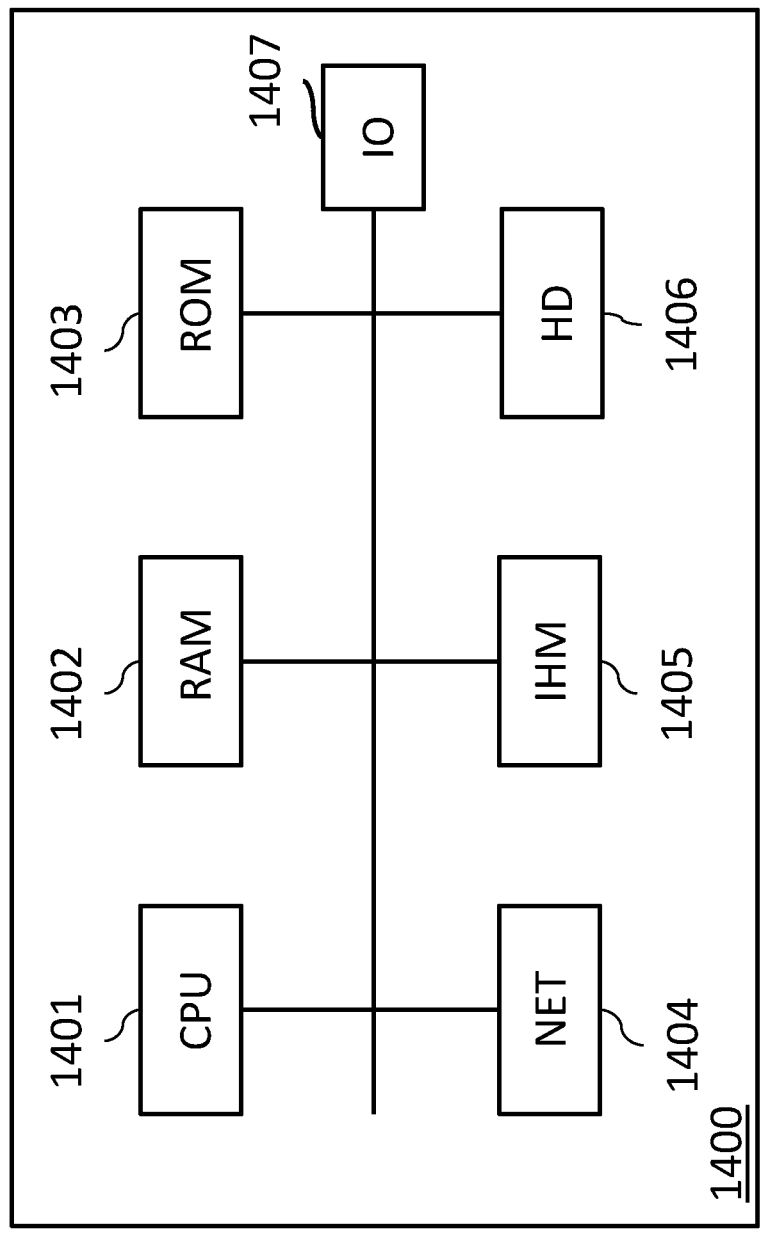
FIG. 14 is a schematic block diagram of a computing device for implementation of one or more embodiments of the invention.

FIG. 14 is a schematic block diagram of a computing device 1400 for implementation of one or more embodiments of the invention. The computing device 1400 may be a device such as a micro-computer, a workstation or a light portable device. The computing device 1400 comprises a communication bus connected to:

- a central processing unit 1401, such as a microprocessor, denoted CPU;
- a random access memory 1402, denoted RAM, for storing the executable code of the method of embodiments of the invention as well as the registers adapted to record variables and parameters necessary for implementing the method for encoding a block of pixels in an image according to embodiments of the invention, the memory capacity thereof can be expanded by an optional RAM connected to an expansion port for example;
- a read only memory 1403, denoted ROM, for storing computer programs for implementing embodiments of the invention;
- a network interface 1404 is typically connected to a communication network over which digital data to be processed are transmitted or received. The network interface 1404 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1401;
- a user interface 1405 may be used for receiving inputs from a user or to display information to a user;
- a hard disk 1406 denoted HD may be provided as a mass storage device;
- an I/O module 1407 may be used for receiving/sending data from/to external devices such as a video source or display.

The executable code may be stored either in read only memory 1403, on the hard disk 146 or on a removable digital medium such as for example a disk. According to a variant, the executable code of the programs can be received by means of a communication network, via the network interface 1404, in order to be stored in one of the storage means of the communication device 1400, such as the hard disk 1406, before being executed.

The central processing unit 1401 is adapted to control and direct the execution of the instructions or portions of software code of the program or programs according to embodiments of the invention, which instructions are stored in one of the aforementioned storage means. After powering on, the CPU 1401 is capable of executing instructions from main RAM memory 1402 relating to a software application after those instructions have been loaded from the program ROM 1403 or the hard-disk (HD) 1406 for example. Such a software application, when executed by the CPU 1401, causes the steps of the flowcharts shown in FIGS. 10, 11, 12 and/or 13 to be performed.

Any step of the algorithms shown in FIGS. 10, 11, 12 and/or 13 may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of lossless encoding a block of pixels in an image, the method comprising the following steps:
    obtaining an input block of input pixels conforming to an input sampling scheme in which at least one sub-sampled input pixel includes main pixel component or components but has secondary pixel component or components missing;
    up-sampling the input block into a pre-encode block of pre-encode pixels conforming to a pre-encode sampling scheme in which all pre-encode pixels have all main and secondary pixel components;
    encoding the pre-encode block of pre-encode pixels using a palette coding mode, the palette coding mode using a palette comprising a set of entries associating respective entry indexes with corresponding sets of pixel component values, and
    wherein encoding the pre-encode block during the lossless encoding of the block of pixels includes encoding at least one pre-encode pixel that corresponds to a sub-sampled input pixel, using a palette entry different from the pre-encode pixel, wherein the palette entry different from the pre-encode pixel includes a value of the main pixel component or components that is equal to a value of the main pixel component or components of the pre-encode pixel and includes a value of the secondary pixel component or components that is different from a value of the secondary pixel component or components of the pre-encode pixel.

2. The method of claim 1, further comprising selecting the palette entry from the palette, wherein selecting the palette entry includes selecting a palette entry having the same main pixel component or components as the pre-encode pixel to encode the pre-encode pixel.

3. The method of claim 2, wherein all the palette entries of the palette are tested for the pre-encode pixel, using a metric that provides that following distortion score:
    a maximum score if the main pixel component or components of the pre-encode pixel and of the palette entry considered do not match or if the pre-encode pixel corresponds to a non-sub-sampled input pixel and does not fully match the palette entry,
    a minimum score if all the pixel components of the pre-encode pixel match the palette entry, and a non-zero score representing a distortion measure between the secondary pixel component or components of the pre-encode pixel and the corresponding secondary pixel component or components of the palette entry considered, otherwise; and one of the tested palette entries is selected based on a rate/distortion criterion.

4. The method of claim 2, wherein the palette entries of the palette are successively considered, and the first considered palette entry that has the same main pixel component or components as the pre-encode pixel to encode the pre-encode pixel is selected.

5. The method of claim 1, further comprising building the palette by iteratively considering each pre-encode pixel and adding a palette entry to the palette when no yet-existing palette entry matches the pre-encode pixel currently considered.

6. The method of claim 5, wherein building the palette further comprises, when considering a current pre-encode pixel corresponding to a non-sub-sampled input pixel:

identifying a matching palette entry already associated with only pre-encode pixel or pixels that correspond to sub-sampled input pixel or pixels, the matching defining a matching between only the main pixel component or components of the current pre-encode pixel and of the palette entry, and forcing the pixel components of the palette entry to the pixel components of the current pre-encode pixel.

7. The method of claim 5, wherein the matching between a palette entry and the pre-encode pixel currently considered includes evaluating a matching:

between only the main pixel component or components of the pre-encode pixel currently considered and of the palette entry when the pre-encode pixel currently considered or all the pre-encode pixels already associated with the palette entry correspond to sub-sampled input pixel or pixels, or between all the main and secondary components of the pre-encode pixel currently considered and of the palette entry, otherwise.

8. The method of claim 1, further comprising predicting the palette using palette entry predictors, wherein predicting the palette includes:

identifying a palette entry associated with only pre-encode pixel or pixels that correspond to sub-sampled input pixel or pixels, and the main pixel component or components of which perfectly matches the corresponding main pixel component or components of a palette entry predictor, forcing the palette entry to the matching palette entry predictor.

9. The method of claim 1, wherein the main pixel component or components include the Luma colour component and the secondary pixel component or components include the Chroma colour components.

10. A non-transitory computer-readable medium storing a program which, when executed by a microprocessor or computer system in a device, causes the device to perform the method of claim 1.

11. A method of encoding blocks of pixels in an image, the pixels having pixel components, the method comprising the following steps:

obtaining a palette comprising a set of entries associating respective entry indexes with corresponding sets of pixel component values;

encoding at least one block of pixels using a palette coding mode, the palette coding mode using the obtained palette to encode at least one pixel with a palette entry index, wherein obtaining the palette includes iterating one or more time a palette building and predicting process, wherein in case the encoding of the blocks of pixels is lossless, iterating only once the palette building and predicting process.

12. The method of claim 11, wherein in case the encoding of the blocks of pixels is lossy, the palette building and predicting process is iterated two or more times to obtain two or more palette candidates, and one of the two or more palette candidates is selected as the obtained palette, based on a rate/distortion criterion.

13. The method of claim 11, wherein different initialized palettes are used to start the two or more iterations of the palette building and predicting process.

14. A method of generating a bitstream from a sequence of images, comprising encoding block of pixels in one or more of the images the method comprising the steps of:

obtaining a palette comprising a set of entries associating respective entry indexes with corresponding sets of pixel component values;

encoding at least one block of pixels using a palette coding mode, the palette coding mode using the obtained palette to encode at least one pixel with a palette entry index, wherein obtaining the palette includes iterating one or more time a palette building and predicting process, wherein in case the encoding of the blocks of pixels is lossless, iterating only once the palette building and predicting process and forming the bitstream from the encoded block of pixels.

15. A non-transitory computer-readable medium storing a program which, when executed by a microprocessor or computer system in a device, causes the device to perform the method of claim 11.

16. A device for lossless encoding a block of pixels in an image, the device comprising at least one microprocessor configured for carrying out, in a web runtime environment running in the device, the steps of:

obtaining an input block of input pixels conforming to an input sampling scheme in which at least one sub-sampled input pixel includes main pixel component or components but has secondary pixel component or components missing;

up-sampling the input block into a pre-encode block of pre-encode pixels conforming to a pre-encode sampling scheme in which all pre-encode pixels have all main and secondary pixel components; and encoding the pre-encode block of pre-encode pixels using a palette coding mode, the palette coding mode using a palette comprising a set of entries associating respective entry indexes with corresponding sets of pixel component values, wherein encoding the pre-encode block during the lossless encoding of the block of pixels includes encoding at least one pre-encode pixel that corresponds to a sub-sampled input pixel, using a palette entry different from the pre-encode pixel, wherein the palette entry different from the pre-encode pixel includes a value of the main pixel component or components that is equal to a value of the main pixel component or components of the pre-encode pixel and includes a value of the secondary pixel component or components that is different from a value of the secondary pixel component or components of the pre-encode pixel.

17. A device for encoding blocks of pixels in an image, the pixels having pixel components, the device comprising at least one microprocessor configured for carrying out, in a web runtime environment running in the device, the steps of:

obtaining a palette comprising a set of entries associating respective entry indexes with corresponding sets of pixel component values;

encoding at least one block of pixels using a palette coding mode, the palette coding mode using the obtained palette to encode at least one pixel with a palette entry index, wherein obtaining the palette includes iterating one or more time a palette building and predicting process, wherein in case the encoding of the blocks of pixels is lossless, iterating only once the palette building and predicting process.

\* \* \* \* \*